United States Patent
Stearn et al.

(10) Patent No.: US 10,394,822 B2
(45) Date of Patent: Aug. 27, 2019

(54) SYSTEMS AND METHODS FOR DATA CONVERSION AND COMPARISON

(71) Applicant: MongoDB, Inc., New York, NY (US)

(72) Inventors: Mathias Benjamin Stearn, New York, NY (US); Eliot Horowitz, New York, NY (US); Geert Bosch, Brooklyn, NY (US)

(73) Assignee: MongoDB, Inc., New York, NY (US)

( * ) Notice: Subject to any disclaimer, the term of this patent is extended or adjusted under 35 U.S.C. 154(b) by 353 days.

(21) Appl. No.: 15/390,345

(22) Filed: Dec. 23, 2016

(65) Prior Publication Data

US 2017/0109398 A1  Apr. 20, 2017

Related U.S. Application Data

(63) Continuation-in-part of application No. 14/992,225, filed on Jan. 11, 2016, now Pat. No. 10,262,050.

(60) Provisional application No. 62/232,979, filed on Sep. 25, 2015, provisional application No. 62/387,455, filed on Dec. 24, 2015.

(51) Int. Cl.
*G06F 17/00* (2019.01)
*G06F 16/2455* (2019.01)
*G06N 5/04* (2006.01)
*G06F 16/22* (2019.01)

(52) U.S. Cl.
CPC ........ *G06F 16/24568* (2019.01); *G06F 16/22* (2019.01); *G06F 16/24561* (2019.01); *G06N 5/04* (2013.01)

(58) Field of Classification Search
CPC ................................................. G06F 16/24568
See application file for complete search history.

(56) References Cited

U.S. PATENT DOCUMENTS

| | | |
|---|---|---|
| 4,918,593 A | 4/1990 | Huber |
| 5,379,419 A | 1/1995 | Heffernan et al. |
| 5,416,917 A | 5/1995 | Adair et al. |
| 5,471,629 A | 11/1995 | Risch |

(Continued)

OTHER PUBLICATIONS

[No Author Listed], Automated Administration Tasks (SQL Server Agent). https://docs.microsoft.com/en-us/sql/ssms/agent/automated-administration-tasks-sql-server-agent. 2 pages. [downloaded Mar. 4, 2017].

(Continued)

*Primary Examiner* — Ajith Jacob
(74) *Attorney, Agent, or Firm* — Wolf, Greenfield & Sacks, P.C.

(57) ABSTRACT

According to one embodiment, a translation component is configured to operate on document encoded data to translate the document encoded data into a canonical format comprising a plurality of canonical types that fold together into a byte stream. The translation component is configured to accept any storage format of data (e.g., column store, row store, LSM tree, etc. and/or data from any storage engine, WIREDTIGER, MMAP, AR tree, Radix tree, etc.) and translate that data into a byte stream to enable efficient comparison. When executing searches and using the translated data to provide comparisons there is necessarily a trade-off based on the cost of translating the data and how much the translated data can be leveraged to increase comparison efficiency.

20 Claims, 14 Drawing Sheets

(56) References Cited

U.S. PATENT DOCUMENTS

| | | |
|---|---|---|
| 5,551,027 A | 8/1996 | Choy et al. |
| 5,598,559 A | 1/1997 | Chaudhuri |
| 5,710,915 A | 1/1998 | McElhiney |
| 5,884,299 A | 3/1999 | Ramesh et al. |
| 5,999,179 A | 12/1999 | Kekic et al. |
| 6,065,017 A | 5/2000 | Barker |
| 6,115,705 A | 9/2000 | Larson |
| 6,240,406 B1 | 5/2001 | Tannen |
| 6,324,540 B1 | 11/2001 | Khanna et al. |
| 6,324,654 B1 | 11/2001 | Wahl et al. |
| 6,339,770 B1 | 1/2002 | Leung et al. |
| 6,351,742 B1 | 2/2002 | Agarwal et al. |
| 6,363,389 B1 | 3/2002 | Lyle et al. |
| 6,385,201 B1 | 5/2002 | Iwata |
| 6,385,604 B1 | 5/2002 | Bakalash et al. |
| 6,505,187 B1 | 1/2003 | Shatdal |
| 6,687,846 B1 | 2/2004 | Adrangi et al. |
| 6,691,101 B2 | 2/2004 | MacNicol et al. |
| 6,823,474 B2 | 11/2004 | Kampe et al. |
| 7,020,649 B2 | 3/2006 | Cochrane et al. |
| 7,032,089 B1 | 4/2006 | Ranade et al. |
| 7,082,473 B2 | 7/2006 | Breitbart et al. |
| 7,177,866 B2 | 2/2007 | Holenstein et al. |
| 7,181,460 B2 | 2/2007 | Coss et al. |
| 7,191,299 B1 | 3/2007 | Kekre et al. |
| 7,246,345 B1 | 7/2007 | Sharma et al. |
| 7,467,103 B1 | 12/2008 | Murray et al. |
| 7,472,117 B2 | 12/2008 | Dettinger et al. |
| 7,486,661 B2 | 2/2009 | Van den Boeck et al. |
| 7,548,928 B1 | 6/2009 | Dean et al. |
| 7,552,356 B1 | 6/2009 | Waterhouse et al. |
| 7,558,481 B2 | 7/2009 | Jenkins et al. |
| 7,567,991 B2 | 7/2009 | Armangau et al. |
| 7,617,369 B1 | 11/2009 | Bezbaruah et al. |
| 7,634,459 B1 | 12/2009 | Eshet et al. |
| 7,647,329 B1 | 1/2010 | Fischman et al. |
| 7,657,570 B2 | 2/2010 | Wang et al. |
| 7,668,801 B1 | 2/2010 | Koudas et al. |
| 7,957,284 B2 | 6/2011 | Lu et al. |
| 7,962,458 B2 | 6/2011 | Holenstein et al. |
| 8,005,868 B2 | 8/2011 | Saborit et al. |
| 8,037,059 B2 | 10/2011 | Bestgen et al. |
| 8,082,265 B2 | 12/2011 | Carlson et al. |
| 8,086,597 B2 | 12/2011 | Balmin et al. |
| 8,108,443 B2 | 1/2012 | Thusoo |
| 8,126,848 B2 | 2/2012 | Wagner |
| 8,170,984 B2 | 5/2012 | Bakalash et al. |
| 8,260,840 B1 | 9/2012 | Sirota et al. |
| 8,296,419 B1 | 10/2012 | Khanna et al. |
| 8,321,558 B1 | 11/2012 | Sirota et al. |
| 8,352,450 B1 | 1/2013 | Mraz et al. |
| 8,352,463 B2 | 1/2013 | Nayak |
| 8,363,961 B1 | 1/2013 | Avidan et al. |
| 8,386,463 B2 | 2/2013 | Bestgen et al. |
| 8,392,482 B1 | 3/2013 | McAlister et al. |
| 8,572,031 B2 | 10/2013 | Merriman et al. |
| 8,589,382 B2 | 11/2013 | Betawadkar-Norwood |
| 8,589,574 B1 | 11/2013 | Cormie et al. |
| 8,615,507 B2 | 12/2013 | Varadarajulu et al. |
| 8,712,993 B1 | 4/2014 | Ordonez |
| 8,751,533 B1 | 6/2014 | Dhavale et al. |
| 8,843,441 B1 | 9/2014 | Rath et al. |
| 8,996,463 B2 | 3/2015 | Merriman et al. |
| 9,015,431 B2 | 4/2015 | Resch et al. |
| 9,069,827 B1 | 6/2015 | Rath et al. |
| 9,116,862 B1 | 8/2015 | Rath et al. |
| 9,183,254 B1 | 11/2015 | Cole et al. |
| 9,262,462 B2 | 2/2016 | Merriman et al. |
| 9,274,902 B1 | 3/2016 | Morley et al. |
| 9,317,576 B2 | 4/2016 | Merriman et al. |
| 9,350,633 B2 | 5/2016 | Cudak et al. |
| 9,460,008 B1 | 10/2016 | Leshinsky et al. |
| 9,660,666 B1 | 5/2017 | Ciarlini et al. |
| 9,740,762 B2 | 8/2017 | Horowitz et al. |
| 9,792,322 B2 | 10/2017 | Merriman et al. |
| 9,805,108 B2 | 10/2017 | Merriman et al. |
| 9,881,034 B2 | 1/2018 | Horowitz et al. |
| 10,031,931 B2 | 7/2018 | Horowitz et al. |
| 10,031,956 B2 | 7/2018 | Merriman et al. |
| 2002/0147842 A1 | 10/2002 | Breitbart et al. |
| 2003/0088659 A1 | 5/2003 | Susarla et al. |
| 2003/0182427 A1 | 9/2003 | Halpern |
| 2003/0187864 A1 | 10/2003 | McGoveran |
| 2004/0133591 A1 | 7/2004 | Holenstein et al. |
| 2004/0168084 A1 | 8/2004 | Owen et al. |
| 2004/0186817 A1 | 9/2004 | Thames et al. |
| 2004/0205048 A1 | 10/2004 | Pizzo et al. |
| 2004/0236743 A1 | 11/2004 | Blaicher et al. |
| 2004/0254919 A1 | 12/2004 | Giuseppini |
| 2005/0033756 A1 | 2/2005 | Kottomtharayil et al. |
| 2005/0038833 A1 | 2/2005 | Colrain et al. |
| 2005/0192921 A1 | 9/2005 | Chaudhuri et al. |
| 2006/0004746 A1 | 1/2006 | Angus et al. |
| 2006/0085541 A1 | 4/2006 | Cuomo et al. |
| 2006/0168154 A1 | 7/2006 | Zhang et al. |
| 2006/0209782 A1 | 9/2006 | Miller et al. |
| 2006/0235905 A1 | 10/2006 | Kapur |
| 2007/0050436 A1 | 3/2007 | Chen et al. |
| 2007/0094237 A1 | 4/2007 | Mitchell et al. |
| 2007/0233746 A1 | 10/2007 | Garbow et al. |
| 2007/0240129 A1 | 10/2007 | Kretzschmar et al. |
| 2008/0002741 A1 | 1/2008 | Maheshwari et al. |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0055350 A1 | 2/2009 | Branish et al. |
| 2009/0094318 A1 | 4/2009 | Gladwin et al. |
| 2009/0222474 A1 | 9/2009 | Alpern et al. |
| 2009/0240744 A1 | 9/2009 | Thomson et al. |
| 2009/0271412 A1 | 10/2009 | Lacapra et al. |
| 2010/0030793 A1 | 2/2010 | Cooper et al. |
| 2010/0030800 A1 | 2/2010 | Brodfuehrer et al. |
| 2010/0106934 A1 | 4/2010 | Calder et al. |
| 2010/0198791 A1 | 8/2010 | Wu et al. |
| 2010/0205028 A1 | 8/2010 | Johnson et al. |
| 2010/0333111 A1* | 12/2010 | Kothamasu ............ H04L 51/14 719/313 |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2012/0076058 A1 | 3/2012 | Padmanabh et al. |
| 2012/0078848 A1 | 3/2012 | Jennas et al. |
| 2012/0084414 A1 | 4/2012 | Brock et al. |
| 2012/0109892 A1 | 5/2012 | Novik et al. |
| 2012/0158655 A1 | 6/2012 | Dove et al. |
| 2012/0159097 A1 | 6/2012 | Jennas, II et al. |
| 2012/0166390 A1 | 6/2012 | Merriman et al. |
| 2012/0198200 A1 | 8/2012 | Li et al. |
| 2012/0221540 A1 | 8/2012 | Rose et al. |
| 2012/0254175 A1 | 10/2012 | Horowitz et al. |
| 2012/0274664 A1 | 11/2012 | Fagnou |
| 2012/0320914 A1 | 12/2012 | Thyni et al. |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0164831 A1 | 6/2014 | Merriman et al. |
| 2014/0279929 A1 | 9/2014 | Gupta et al. |
| 2015/0074041 A1 | 3/2015 | Bhattacharjee et al. |
| 2015/0242531 A1 | 8/2015 | Rodniansky |
| 2015/0278295 A1 | 10/2015 | Merriman et al. |
| 2015/0301901 A1 | 10/2015 | Rath et al. |
| 2016/0203202 A1 | 7/2016 | Merriman et al. |
| 2016/0246861 A1 | 8/2016 | Merriman et al. |
| 2017/0032007 A1 | 2/2017 | Merriman |
| 2017/0032010 A1 | 2/2017 | Merriman |
| 2017/0091327 A1 | 3/2017 | Bostic et al. |
| 2017/0109399 A1 | 4/2017 | Steam et al. |

(56) References Cited

U.S. PATENT DOCUMENTS

| | | | |
|---|---|---|---|
| 2017/0109421 A1 | 4/2017 | Steam et al. |
| 2017/0169059 A1 | 6/2017 | Horowitz et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286510 A1 | 10/2017 | Horowitz et al. |
| 2017/0286516 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0322996 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371750 A1 | 12/2017 | Horowitz et al. |
| 2017/0371968 A1 | 12/2017 | Horowitz et al. |
| 2018/0004804 A1 | 1/2018 | Merriman et al. |
| 2018/0095852 A1 | 4/2018 | Keremane et al. |
| 2018/0096045 A1 | 4/2018 | Merriman et al. |
| 2018/0165338 A1 | 6/2018 | Kumar et al. |
| 2018/0300209 A1 | 10/2018 | Rahut |
| 2018/0300381 A1 | 10/2018 | Horowitz et al. |
| 2018/0300385 A1 | 10/2018 | Merriman et al. |
| 2018/0314750 A1 | 11/2018 | Merriman et al. |
| 2018/0365114 A1 | 12/2018 | Horowitz |

OTHER PUBLICATIONS

Chang et al., Bigtable: a distributed storage system for structured data. OSDI'06: Seventh Symposium on Operating System Design and Implementation. Nov. 2006.

Cooper et al., PNUTS: Yahoo!'s hosted data serving platform. VLDB Endowment. Aug. 2008.

Decandia et al., Dynamo: Amazon's highly available key-value store. SOSP 2007. Oct. 2004.

Nelson et al., Automate MongoDB with MMS. PowerPoint Presentation. Published Jul. 24, 2014. 27 slides. http://www.slideshare.net/mongodb/mms-automation-mongo-db-world.

Poder, Oracle living books. 2009. <http://tech.e2sn.com/oracle/sql/oracle-execution-plan-operation-reference >.

Stirman, Run MongoDB with Confidence using MMS. PowerPoint Presentation. Published Oct. 6, 2014. 34 slides. http://www.slideshare.net/mongodb/mongo-db-boston-run-mongodb-with-mms-20141001.

Van Renesse et al., Chain replication for supporting high throughput and availability. OSDI. 2004: 91-104.

Walsh et al., Xproc: An XML Pipeline Language. May 11, 2011. <https://www.w3.org/TR/xproc/>.

Wikipedia, Dataflow programming. Oct. 2011. <http://en.wikipedia.org/wiki/Dataflow_programming>.

Wikipedia, Pipeline (Unix). Sep. 2011. <http://en.wikipedia.org/wild/Pipeline (Unix)>.

Wilkins et al., Migrate DB2 applications to partitioned database. developerWorks, IBM. Apr. 24, 2008, 33 pages.

\* cited by examiner

FIG. 14

Examples

| Value | Hex Key + Type Bits | Type Bits | Bytes/Key | Total Bytes |
|---|---|---|---|---|
| 42 | 2B5404 | 0 | 3.00 | 3 |
| 42ll | 2B5404 01 | 2 | 3.25 | 4 |
| Decimal128("42") | 2B5404 07 | 8 | 4.00 | 4 |
| 1234.5 | 2C09A58000000000000004 01 | 2 | 10.25 | 11 |
| Decimal128("1234.50") | 2C09A58000000000000004 7B | 8 | 11.00 | 11 |
| 88205999.0 | 2E0A83D55E04 02 | 2 | 6.25 | 8 |
| Decimal128("88205999.00") | 2E0A83D55E04 7B | 8 | 7.00 | 8 |
| -12345678901234.5 | 22E98B1863A01A7FFF04 01 | 2 | 10.25 | 11 |
| Decimal128("-12345678901234.5000") | 22E98B1863A01A7FFF04 3B | 8 | 11.00 | 11 |
| 8.875 | 2B11E000000000000000004 01 | 2 | 10.25 | 11 |
| Decimal128("8.8750000000000000") | 2B11E000000000000000004 4B | 8 | 11.00 | 11 |
| 9223372036854775808.0 | 3307C00000000000000004 01 | 2 | 10.25 | 11 |
| Decimal128(9223372036854775808) | 3307C00000000000000004 07 | 8 | 11.00 | 11 |
| Decimal128("0.02") | 2AFE51EB851EB851EA04 7B | 8 | 11.00 | 11 |
| Decimal128("1.234473845470E+16") | 3157BBE03E7AF12004 81C7 | 9 | 10.00 | 12 |
| Decimal128("3.344300000000E-50") | 28295BE660354EC5D104 47 | 8 | 11.00 | 11 |
| 1.749582107028023e+308 | 337FDE498551F78E3804 01 | 2 | 10.25 | 11 |
| Decimal128("1.749582107028022629879095884380864E+308") | 337FDE498551F78E2F02C5109E63D27FEC04 81CF | 8 | 19.00 | 21 |

SYSTEMS AND METHODS FOR DATA CONVERSION AND COMPARISON

RELATED APPLICATIONS

This application claims priority under 35 U.S.C. § 119(e) to U.S. Provisional App. No. 62/387,455, entitled "SYSTEMS AND METHODS FOR DATA CONVERSION AND COMPARISON," filed Dec. 24, 2015; and this application is a continuation-in-part of and claims priority under 35 U.S.C. 120 § to U.S. app. Ser. No. 14/992,225, entitled "DISTRIBUTED DATABASE SYSTEMS AND METHODS WITH PLUGGABLE STORAGE ENGINES," filed Jan. 11, 2016, which claims priority under 35 U.S.C. § 119(e) to U.S. Provisional App. No. 62/232,979, entitled "DISTRIBUTED DATABASE SYSTEMS AND METHODS WITH PLUGGABLE STORAGE ENGINES," filed Sep. 25, 2015, each of the foregoing applications are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Any improvement in efficiency for any data retrieval operation in a distributed database has the potential to significantly improve operation, efficiency, and/or scalability of the distributed database. Indexes are conventional technology that is leveraged in almost every known database to improve efficiency of data retrieval. Typical database indexes include copies of certain fields of data that are logically ordered to be searched efficiently. For example, each entry in the index may consist of a key-value pair that represents a document or field (i.e., the value), and provides an address or pointer to a low-level disk block address where the document or field is stored (the key).

SUMMARY

According to one aspect, database query operations can be significantly improved by translating searched data into a form susceptible to byte by byte comparison rather than requiring execution of complicated comparison logic. According to one embodiment, index data can be converted and maintained in memory to be used to process incoming data requests. For example, retrieval of searched data can be reduced to a byte by byte comparison (e.g., similar to execution of a UNIX memcmp( ) operation) until an indexed data field is found and used to reference the requested data, for example, via an index pointer or for example as part of a stored indexed document.

According to one aspect a database system is provided. The system comprises at least one processor configured to execute a plurality of system components. The system components include a translation component configured to translate input data (e.g., an index collection, data collection, document based data, etc.) in a first format into a canonical format, analyze original data elements (e.g., documents, records, attribute value pairs, etc.) in the first format to determine a data type (e.g., integer, float, double, long integer, string, string with code, etc.) associated with respective data elements, map each individual data element of the input data to a canonical data type (e.g., unique data type (e.g., unique in relation to the canonical types)) associated with the determined data type, encode each individual data element into a byte stream further comprising a canonical type byte (e.g., 011 for Boolean type data, etc.) based on the mapping, and at least one data value for data of the data element where present, and a database manager configured to receive requests for database operations from client systems and respond to the requests, and execute data comparison operations against the canonical format byte stream to respond to at least some of the requests for database operations.

According to one embodiment, the translation component is further configured to identify index data within the database, and select the index data for translation. According to one embodiment, the translation component is configured to store (e.g., directly or indirectly) the canonical byte format byte stream in a segregated memory space. According to one embodiment, the system further comprises a memory for segregating index data, and the database manager is configured to access the canonical format byte stream from the memory. According to one embodiment, the system further comprises a translation matrix defining a mapping between a data type in a first format and an encoding of any data values associated with the data type in the first format, wherein the translation component is further configured to access the translation matrix to generate the canonical format byte stream from the input data.

According to one embodiment, the translation matrix defines a mapping for each of the data types having the first format to a respective canonical data type and associated type byte value. According to one embodiment, the translation matrix includes encoding mappings defining data element value encoding operations, such that, each data type and data value in the first data format is encoded as a canonical byte type value and at least one data byte value. According to one embodiment, the translation matrix includes encoding mappings for data elements having array data or having internal data elements (e.g., document within document). According to one embodiment, the encoding mappings define flags to encode in the byte stream for preserving ordering of array data and/or the internal data elements, when translated into the canonical byte stream.

According to one aspect computer implemented method for managing a distributed database is provided. The method comprises translating, by at least one processor input data (e.g., an index collection, data collection, document based data, etc.) in a first format into a canonical format, analyzing, by the at least one processor, original data elements (e.g., documents, records, attribute value pairs, etc.) in the first format to determine a data type (e.g., integer, float, double, long integer, string, string with code, etc.) associated with respective data elements, mapping, by the at least one processor, each individual data element of the input data to a canonical data type (e.g., unique data type (e.g., unique in relation to the canonical types)) associated with the determined data type, encoding, by the at least one processor, each individual data element into a byte stream comprising at least: a canonical type byte (e.g., 011 for Boolean type data, etc.) based on the mapping, and at least one data value for data of the data element where present, and receiving, by the at least one processor, requests for database operations from client systems and responding to the requests, and executing, by the at least one processor, data comparison operations against the canonical format byte stream to respond to at least some of the requests for database operations.

According to one embodiment, the method further comprises identifying, by the at least one processor, index data within the distributed database, and selecting, by the at least one processor, the index data for translation. According to one embodiment, the method further comprises storing, by the at least one processor, (e.g., directly or indirectly) the canonical byte format byte stream in a segregated memory space. According to one embodiment, the method further comprises accessing, by the at least one processor, the canonical format byte stream from a segregated memory space. According to one embodiment, the method further comprises mapping, by the at least one processor, between a data type in a first format and an encoding of any data values associated with the data type in the first format, wherein mapping includes accessing the translation matrix and generating the canonical format byte stream from the input data.

According to one embodiment, the method further comprises executing, by the at least one processor, a mapping defined in the translation matrix for each of the data types having the first format to a respective canonical data type and associated type byte value. According to one embodiment, the method further comprises encoding, by the at least one processor, each data type and data value in the first data format into a canonical byte type value and at least one data byte value based on the translation matrix. According to one embodiment, the method further comprises encoding, by the at least one processor, each data type and data value in the first data format into a canonical byte type value and at least one data byte value for data elements having array data or having internal data elements (e.g., document within document), recursively encoding array elements or internal data elements, and maintaining respective ordering. According to one embodiment, the method further comprises encoding, by the at least one processor, translated data with flags in the byte stream that preserve ordering of array data and/or the internal data elements, when translated into the canonical byte stream.

According to one aspect, a computer-readable medium having instructions thereon for causing a processor to execute the instructions, the instructions adapted to be executed to implement a method for managing a distributed database is provided. The method comprises translating input data (e.g., an index collection, data collection, document based data, etc.) in a first format into a canonical format, analyzing original data elements (e.g., documents, records, attribute value pairs, etc.) in the first format to determine a data type (e.g., integer, float, double, long integer, string, string with code, etc.) associated with respective data elements, mapping each individual data element of the input data to a canonical data type (e.g., unique data type (e.g., unique in relation to the canonical types)) associated with the determined data type, encoding each individual data element into a byte stream comprising at least: a canonical type byte (e.g., 011 for Boolean type data, etc.) based on the mapping, and at least one data value for data of the data element where present, and receiving requests for database operations from client systems and responding to the requests, and executing data comparison operations against the canonical format byte stream to respond to at least some of the requests for database operations.

According to one embodiment, the method further comprises identifying, by the at least one processor, index data within the distributed database, and selecting, by the at least one processor, the index data for translation.

According to one aspect a database system is provided. The system comprises at least one processor configured to execute a plurality of system components, wherein the system components include a monitor component configured to determine an expected set of operations to be performed on a portion of a distributed database, a data format selection component configured to select, based on at least one characteristic of the expected set of operations, a data format for the portion of the distributed database and an associated storage engine from a plurality of storage engines and data formats, at least one storage API for mapping a data request to the associated storage engine that executes the data request on the portion of the distributed database in the selected data format, a translation component configured to translate selected data, including at least index data, in the selected data format into a canonical byte stream format for in memory comparison, a database manager configured to receive requests for database operations from client systems and respond to the data requests; and execute data comparison operations against the canonical format byte stream to respond to at least some of the requests for database operations.

According to one embodiment, the data format selection component is configured to select the associated storage engine and the data format responsive to determining data translation increases efficiency (e.g., identifies high proportion of indexed data accesses (e.g., >10%, >15%, >20%) of data requests use indexed data or identifies sufficient index data accesses with low rate of change in indexed data (e.g., no index changes in one day, two days, three days, four days, one week, two weeks, three weeks, one month, etc.)).

According to one embodiment, the translation component is configured to analyze original data elements (e.g., documents, records, attribute value pairs, etc.) in a first format to determine a data type (e.g., integer, float, double, long integer, string, string with code, etc.) associated with respective data elements, map each individual data element of the input data to a canonical data type (e.g., unique data type (e.g., unique in relation to the canonical types)) associated with the determined data type, and encode each individual data element into a byte stream further comprises at least a canonical type byte (e.g., 011 for Boolean type data, etc.) based on the mapping, and at least one data value for data of the data element where present.

According to one embodiment, the translation component is further configured to identify index data within the database, and select the index data for translation into the canonical byte stream format. According to one embodiment, the translation component is configured to store (e.g., directly or indirectly) the canonical byte format byte stream in a segregated memory space. According to one embodiment, the database system further comprises a memory for segregating index data, and the database manager is configured to access the canonical formation byte stream from the memory. According to one embodiment, the system further comprises a translation matrix defining a mapping between a data type in a first format and an encoding of any data values associated with the data type in the first format, wherein the translation component is further configured to access the translation matrix to generate the canonical format byte stream from the input data. According to one embodiment, the translation component executes a mapping defined in the translation matrix for each of the data types having the first format to a respective canonical data type and associated type byte value.

According to one embodiment, the translation component is configured to encode each data type and data value in the first data format into a canonical byte type value and at least one data byte value based on the translation matrix. According to one embodiment, the translation component is configured to encode each data type and data value in the first data format into a canonical byte type value and at least one data byte value for data elements having array data or having internal data elements (e.g., document within document) by recursively encoding array elements or internal data elements and maintaining respective ordering. According to one embodiment, the translation component is configured to encode translated data with flags in the byte stream that preserve ordering of array data and/or the internal data elements, when translated into the canonical byte stream.

According to one aspect a computer implemented method for managing a distributed database is provided. The method comprises determining, by at least one processor, an expected set of operations to be performed on at least a portion of a distributed database, selecting, by the at least one processor, a data format for the at least the portion of the distributed database and an associated storage engine from a plurality of storage engines and data formats, based on at least one characteristic of the expected set of operations, mapping, by the at least one processor, a data request (e.g., read, write, modify, etc.) for the distributed database to the associated storage engine that executes the data request on the portion of the distributed database in the selected data format, translating, by the at least one processor, selected data, including at least index data, stored in a first format into a canonical byte stream format for in memory comparison; receiving, by the at least one processor, requests for database operations from client systems and responding to the requests, and executing, by the at least one processor, data comparison operations against the canonical format byte stream to respond to at least some of the requests for database operations.

According to one embodiment, selecting the associated storage engine and the data format includes an act of determining data translation increases efficiency (e.g., identifies high proportion of indexed data accesses (e.g., >10%, >15%, >20%, >30%) of data requests (e.g., uses indexed data, identifies sufficient index data accesses (e.g., lower percentage of index reference sufficient when coupled with low rate of change in indexed data (e.g., no index changes in one day, two days, three days, four days, one week, two weeks, three weeks, one month, etc.))).

According to one embodiment, the method further comprises analyzing original data elements (e.g., documents, records, attribute value pairs, etc.) in the first format to determine a data type (e.g., integer, float, double, long integer, string, string with code, etc.) associated with respective data elements, mapping each individual data elements of the input data to a canonical data type (e.g., unique data type (e.g., unique in relation to the canonical types)) associated with the determined data type, and encoding each individual data element into a byte stream comprising at least: a canonical type byte (e.g., 011 for Boolean type data, etc.) based on the mapping and at least one data value for data of the data element where present. According to one embodiment, the method further comprises identifying index data within the database, and selecting the index data for translation into the canonical byte stream format.

According to one embodiment, the method further comprises storing (e.g., directly or indirectly) the canonical byte format byte stream in a segregated memory space. According to one embodiment, the method further comprises: segregating index data in a memory; and accessing the canonical formation byte stream from the memory. According to one embodiment, the method further comprises accessing a translation matrix defining a mapping between a data type in a first format and an encoding of any data values associated with the data type in the first format to generate the canonical format byte stream from the input data. According to one embodiment, the method further comprises executing a mapping defined in the translation matrix for each of the data types having the first format to a respective canonical data type and associated type byte value.

According to one embodiment, the method further comprises encoding each data type and data value in the first data format into a canonical byte type value and at least one data byte value based on the translation matrix. According to one embodiment, the method further comprises encoding each data type and data value in the first data format into a canonical byte type value and at least one data byte value for data elements having array data or having internal data elements (e.g., document within document) by recursively encoding array elements or internal data elements and maintaining respective ordering. According to one embodiment, the method further comprises encoding translated data with flags in the byte stream that preserve ordering of array data or the internal data elements, when translated into the canonical byte stream.

According to one aspect a database system is provided. The database system comprises at least one processor configured to execute a plurality of system components. The system components further comprise a translation component configured to translate input data (e.g., an index collection, data collection, document based data, etc.) in a first format into a canonical format, map individual data elements of the input data to a canonical data type (e.g., unique data type (e.g., unique in relation to the canonical types)) associated with the determined data type, encode each individual data element into a byte stream comprising at least, a canonical type byte (e.g., 011 for Boolean type data, etc.) based on the mapping, and at least one data value for data of the data element where present, wherein the translation component is further configured to generate a hybrid encoding for floating point numbers, wherein the hybrid encoding further comprises a decimal continuation marker for encoding decimal numbers .

According to one embodiment, the hybrid encoding is configured to enable bit-exact reconstruction decimal value (e.g., decimal 128 values). According to one embodiment, the translation component is configured to generate a first hybrid encoding for decimal numbers meeting a threshold number of significant digits. According to one embodiment, the translation component is configured to generate a high precision encoding for decimal numbers exceeding the threshold number of significant digits. According to one embodiment, the translation component is further configured to limit the decimal continuation to a threshold number of bytes (e.g., 8) for numbers with more than the threshold number of significant digits.

According to one embodiment, the database executes comparison operations against translated values. According to one embodiment, the system further comprises a database manager configured to receive requests for database operations from client systems and respond to the requests, and execute data comparison operations against the canonical format byte stream to respond to at least some of the requests for database operations. According to one embodiment, the database is further configured to compare encoded values to identify differences in numbers of trailing zeros. According to one embodiment, the database is further configured to control use of the hybrid encoding based on a state value. According to one embodiment, the database is further configured to monitor user requests and return an error on requests associated with the hybrid encoding based on evaluating the state value.

According to one aspect a computer implemented method for managing a distributed database is provided. The method comprises translating, by at least one processor input data (e.g., an index collection, data collection, document based data, etc.) in a first format into a canonical format, analyzing, by the at least one processor, original data elements (e.g., documents, records, attribute value pairs, etc.) in the first format to determine a data type (e.g., integer, float, double, long integer, string, string with code, etc.) associated with respective data elements, mapping, by the at least one processor, individual data elements of the input data to a canonical data type (e.g., unique data type (e.g., unique in relation to the canonical types)) associated with the determined data type, encoding, by the at least one processor, individual data elements into a byte stream comprising at least: a canonical type byte (e.g., 011 for Boolean type data, etc.) based on the mapping, and at least one data value for data of the data element where present, and wherein the act of encoding includes generating a hybrid encoding for floating point numbers, wherein the hybrid encoding further comprises a decimal continuation marker for encoding decimal numbers.

According to one embodiment, the act of generating the hybrid encoding includes generating bit-exact encoding of a decimal value (e.g., decimal 128 values). According to one embodiment, the act of generating the hybrid encoding includes generating a first hybrid encoding for decimal numbers meeting a threshold number of significant digits. According to one embodiment, the act of generating the hybrid encoding includes generating a high precision encoding for decimal numbers exceeding the threshold number of significant digits. According to one embodiment, the act of generating includes limiting the decimal continuation to a threshold number of bytes (e.g., 8) for numbers with more than the threshold number of significant digits.

According to one embodiment, the method further comprises executing, by the at least one processor, comparison operations against translated values. According to one embodiment, the method further comprises receiving, by the at least one processor, requests for database operations from client systems and responding to the requests, and executing, by the at least one processor, data comparison operations against the canonical format byte stream to respond to at least some of the requests for database operations. According to one embodiment, executing the data comparison operations includes identifying differences in numbers of trailing zeros. According to one embodiment, the method further comprises an act of controlling, by the at least one processor, use of the hybrid encoding based on a state value.

According to one embodiment, the method further comprises an act of monitoring user requests and permitting execution or returning an error for requests associated with the hybrid encoding based on evaluating the state value.

According to some embodiments, non-relational databases and/or databases that organize data without enforcing a schema may require complex comparison logic to implement indexes that improve efficiency in data retrieval. For example, when an index is stored in a document format, the index document can include references to other documents, can include array data, etc. Searching through data stored in a document format becomes complex, and must take into account any ordering of the data appearing in the documents. In one example, a "document" is a collection of field-value associations relating to a particular data entity (e.g., a database index), and in some examples, the document and/or collection forms a base unit of data storage for a distributed database system. Fields are similar to rows in a relational database, but do not require the same level of organization, and are therefore less subject to architectural constraints. One example of a document includes a binary encoded serialization of JSON-like documents ("BSON") that is used by the well-known MONGODB™ database. BSON supports the embedding of documents and arrays within other documents and arrays. Having this support enhances functionality but complicates comparisons, for example, of an incoming data request against a document based index.

In the MONGODB™ database, for example, a primary key index is a mapping from primary key columns to a recordId field. Going from recordId field to the document requires searching the index (e.g., a b-tree or log-structured merge (LSM) tree for a WIREDTIGER™ storage engine employed in the MONGODB database). The search on the index fields returns a pointer to a low-level disk block address where the document or field is stored (the key). The variety of search engines and storage formats may further complicate the use of index data, and impact reference/retrieval performance.

According to one embodiment, a translation component is configured to operate on document encoded data to translate the document encoded data into a canonical format comprising a plurality of canonical types that fold together into a byte stream. The translation component is configured to accept any storage format of data (e.g., column store, row store, LSM tree, etc. and/or data from any storage engine, WIREDTIGER, MMAP, AR tree, Radix tree, etc.) and translate that data into a byte stream to enable efficient comparison. When executing searches and using the translated data to provide comparisons there is necessarily a trade-off based on the cost of translating the data and how much the translated data can be leveraged to increase comparison efficiency.

According to one embodiment, translating, for example, index data (e.g., stored as an LSM tree) into a byte stream increase comparison efficiency by anywhere up to 30% (factoring in costs of translation), and therefore, a faster and more efficient database engine that implements such indexes may be provided. In one example, straight byte comparisons can provide significant increase in time efficiency, and in others space efficiency can be improved as well. According to another embodiment, translating index data is particularly suited to improving operational efficiency of the entire distributed database. For example, once translated, the translated index data is used frequently to speed information retrieval from the distributed database. Often indexes do not change with the same frequency as underlying database data, thus the cost of translation is spread over a larger number of operations. And in yet other examples, index data can be stored in its own memory space allowing any translation costs to be minimized over large numbers of database operations, as the translated data can be maintained and used in memory over long periods of time.

In further embodiments, the translation component is configured to preserve ordering from any underlying documents and/or data being translated. In document storage formats, retaining ordering of the stored data can be necessary to delivering correct comparisons. It is realized that in order to architect the canonical format of the translated data, the architecture must enable various properties. For example, at each point in a comparison operation, the canonical architecture is configured such that the system is performing the comparison on data appearing before a next possible value and before each and any subsequent value. In other words, the system compares one record and moves onto the next record in the byte stream preserving ordering of the pre-translated data. In some embodiments, the translation into the canonical format is architected to enable recovery of the original format without any loss of data.

According to another embodiment, each type of data subject to translation must be mapped to at least one unique canonical data type when translated. Thus for a distributed database, any data type within the database can include a mapping to a translated unique data type. An undefined type can be used to handle cases on unidentified data. In one example, generating unique mappings during translation can include reserving data values used in the byte stream to represent a minimum value and a maximum value. For example, reserving a maximum value enables byte comparisons that execute properly in response to data of differing lengths, and/or where null values must be compared properly. In one example, a challenge in any such translation is ensuring that within the byte stream a comparison of a value "ball" followed by the reserved maximum indicator occurs in proper order when considered with value "balloon" followed by any byte. Further, indexes may be created such that the index values indicate the type of data identified within the document. Such information may be used for many reasons, such as to characterize the data, increase search or other database operation performance, group or segregate documents, determine storage locations and/or requirements, compress information within the document, limit the amount of processing of the actual documents during database operations (e.g., avoid casting from external code), provide similar relational database functions for a document-based database, simplifying code that accesses such document databases, among any other database function or operation.

Data architectures can impact performance of data retrieval operations. Some conventional approaches to database storage are typically tied to a particular data format and, in further approaches, a specific storage engine to manage that data format. The translation component is configured to map any format to a canonical byte stream, and the distributed database can then employ the byte stream to improve comparison efficiency, and/or space efficiency, in various embodiments.

According to another aspect, the translation component can be implemented as part of one or more storage engines, and can also be implemented to execute at respective ones of a plurality of storage engines can be selective used by the distributed database. For example, the translation component can be configured to work with and/or through a plurality of pluggable storages engines described in co-pending application Ser. No. 14/992,225 entitled "DISTRIBUTED DATABASE SYSTEMS AND METHODS WITH PLUGGABLE STORAGE ENGINES," filed Jan. 11, 2016, which claims priority under 35 U.S.C. §119(e) to U.S. Provisional App. No. 62/232,979, entitled "DISTRIBUTED DATABASE SYSTEMS AND METHODS WITH PLUGGABLE STORAGE ENGINES," filed Sep. 25, 2015, each of which applications are incorporated by reference herein. In further embodiments, the translation component can be integrated with or instantiated in conjunction with methods and systems by which a storage application programming interface (API) is employed as an abstraction layer in database operations (e.g., write or read operations).

In one example, a database application may simply instruct the storage API to "write" or "read" a particular piece of data to or from a collection, and the storage API selects an appropriate storage engine. A storage API or a database API that manages query response and/or interaction with the storage API may retrieve index data at start-up of a database node (e.g., a system hosting at least a portion of the database data). The translation component can be executed at or through either API to translate, for example, index data that is loaded into memory and used to optimize data operations. In further examples, storage engines can be selected based on automated optimization analysis, user preference, or other factors, and each storage engine can include a translation component. In some embodiments, a storage engine can be configured to determine when a translation operation is likely to improve efficiency of a database and trigger translation accordingly. For example, the storage engine can analyze historic data usage (e.g., average time to change index data, average number of requests referencing index data, etc.) and compare with the computational cost of translating the data against the savings in computational burden when comparing data streams in memory as opposed to the complex comparison logic for document based comparisons. For example, where a computational savings is expected based on the comparison, the system can translate the index data and maintain the translated data in memory for subsequent comparisons. Additionally, the system can invoke monitoring to confirm the expected computational savings based on actual usage over time.

It is further realized that conventional approaches to database storage are typically tied to a particular data format and, in some approaches, a storage engine capable of managing that data format. While the format may be changed with some effort, conventional approaches require significant time and involve complexity that makes such changes difficult, at best. For example, modifications to the data format and/or the storage engine may need to comply with forward-and backward-compatibility requirements. The inefficiency of being tied to a particular format is exacerbated by the advent of "big data" and ever-larger databases. More efficient storage and retrieval of the information stored in databases is increasingly important. While a number of storage formats have been employed in storing database data, the selection of a particular format has largely been dependent on intuition and guesswork of the user and/or the application software developer. Furthermore, adding or modifying storage functionality in a particular storage format has typically required changes to the high-level database code in user applications and system routines. Scaling a database up in size has similarly presented issues, as the database read/write operations coded in an application may be tailored to a data format that is no longer optimal.

There is therefore a need for a database that can store data in the optimal data format including analysis of transformation of a stored data type into a canonical byte stream format tailored to a particular situation, all without requiring changes to the applications or processes accessing that data. Accordingly, methods and systems are provided by which a storage application programming interface (API) is employed as a level of abstraction in database read/write operations that may be execution in conjunction with a translation component and/or API. In various embodiments, a database application may simply instruct the storage API to "write" or read a portion of a database, and the database engine, storage API, and/or translation components sets or selects an appropriate storage engine (and for example a byte stream format) based on automated optimization analysis, user preference, or other factors. In some embodiments, the database application may request that data be stored by a particular storage engine, or stored in a particular format, including, for example byte stream formats. The database engine may fulfill the request, and may also cause the data to be stored in a different format determined to be optimal.

In some embodiments, storage engines may be modular and "pluggable," allowing for modification, removal, or addition of storage engines without changing the application code. In further embodiments, the storage engine may determine to store the data in one or more data formats, including an optimal format that the storage engine determines. In further examples, the storage engine can select in memory formats and different on disk storage formats.

According to one embodiment, operation requests received by the database may be carried out such that different portions of the database may be stored by different storage engines in different formats, enabling optimization of storage operations at various levels in a database (e.g., entire database, partitions, logical groupings, indexes, and/or any base unit of storage). Optimization decisions can be made at each step as the level of granularity increases from the database engine to the storage engine to the particular data format. For example, a "read" or "write" request received by the database may cause the database engine to select a particular storage engine to carry out the request; the storage engine may then determine an optimal format in which to store the data.

A storage API interacting with a database engine and/or translation engine that is capable of calling pluggable storage engines in such a manner offers a number of benefits. For example, application code is simplified. Fewer modifications may be required to switch between engines, because the storage API is opaque to the user, who need not be concerned with format-specific operations underlying "write" operations or other access requests. The same query language, data model, scaling considerations, security protocols, and operational tooling may be used no matter the underlying data format.

Further, a database engine calling pluggable storage engines offers benefits to database systems employing replica sets having a primary node and one or more replica secondary nodes. A storage API allows such replica sets to be easily managed with minimal code, as the storage API allows a user to simultaneously write to a primary node in one format, and to a replica node in another format, without regard to the respective data formats. This approach allows live migration between different storage engines and/or data formats, thereby reducing the complexity and time required for conventional approaches.

In addition, the database engine underlying the storage API may be configured to automatically select a storage engine (i.e., and associated data format), allowing for dynamic changes to the format of a particular set of data based on historic and/or expected data operations and volume, data structure and characteristics, and other factors. Any change in data format can be monitored, and a comparison can made between the performance and efficiency observed in the previous and current data format. Based on that comparison, any necessary adjustments can be made. For example, byte stream translations can be turned off if an expected savings in computational burden is not realized. In some embodiments, the previous and current data format may be maintained in parallel for some amount of time, to allow for a comparison and selection of an optimal format.

According to one aspect of the present invention, a database system is provided comprising at least one processor configured to execute a plurality of system components, wherein the system components comprise an operation prediction component configured to determine an expected set of operations to be performed on a portion of the database, a data format selection component configured to select, based on at least one characteristic of the expected set of operations, a data format for the portion of the database, and at least one storage engine for writing the portion of the database in the selected data format. According to one embodiment, the operation prediction component is further configured to access information about a past set of operations for a first time period, and predict, based on the past set of operations for the first time period, an expected set of operations to be performed on the portion of the database during a second time period. According to one embodiment, the operation prediction component is further configured to determine the expected set of operations to be performed on the portion of the database by identifying a data structure for data to be stored in the portion of the database. According to one embodiment, the characteristic of the expected set of operations is a relatively high ratio of read operations to write operations. According to another embodiment, the data format is a row-store format.

According to one embodiment, the data format is a column-store format. According to one embodiment, the characteristic of the expected set of operations is a determination that sequential operations are likely to be performed on a first storage location and a second storage location nearby the first storage location. According to one embodiment, the characteristic of the expected set of operations is a relatively high ratio of write operations to read operations. According to one embodiment, the data format is a log-sequence merge format. According to another embodiment, the characteristic of the expected set of operations is a requirement to update less than all of the fields in a plurality of records stored in the database, and wherein the data format is a column-store format.

According to another aspect of the present invention, a method of performing operations in a computer database is provided comprising steps of determining, by a computer system, an expected set of operations to be performed on a portion of a database, selecting, based on at least one characteristic of the expected set of operations, a data format for the portion of the database, storing the selected data format in a configuration metadata component of the computer database, and writing data to the portion of the database in the selected data format. According to one embodiment, determining the expected set of operations to be performed on the portion of the database comprises accessing information about a past set of operations for a first time period, and predicting, based on the past set of operations for the first time period, an expected set of operations to be performed on the portion of the database during a second time period. According to another embodiment, determining the expected set of operations to be performed on the portion of the database comprises identifying a data structure for data to be stored in the portion of the database.

According to one embodiment, the characteristic of the expected set of operations is a relatively high ratio of read operations to write operations. According to one embodiment, the first data format is a row-store format. According to one embodiment, the first data format is a column-store format. According to one embodiment, the characteristic of the expected set of operations is a determination that sequential operations are likely to be performed on a first storage location and a second storage location nearby the first storage location. According to one embodiment, the characteristic of the expected set of operations is a relatively high ratio of write operations to read operations. According to another embodiment, the second data format is a log-sequence merge format. According to yet another embodiment, the first characteristic of the expected set of operations is a requirement to update less than all of the fields in a plurality of records stored in the database, and wherein the first data format is a column-store format.

According to another aspect of the present invention, a method of performing operations in a computer database is provided comprising steps of presenting, in a user interface of a computer system, a plurality of data format options for a portion of a database, receiving, from the user interface, a user selection of a data format for the portion of the database, storing the data format selection as configuration metadata for the database, responsive to the data format selection indicating a first data format, activating a first storage engine to store the portion of the database in the first data format, and responsive to the data format selection indicating a second data format, activating a second storage engine to store the portion of the database in the second data format. According to one embodiment, the first data format is a row-store format. According to one embodiment, the first data format is a column-store format. According to another embodiment, the second data format is a log-sequence merge format.

According to one aspect of the present invention, a method of performing operations in a computer database, comprising steps of receiving, from a computer application, a request to perform a write operation, wherein the request does not specify a data storage format, selecting, by a computer system, a data storage format from a group consisting of at least a first data storage format and a second data storage format, responsive to a selection of the first data storage format, performing the write operation using a first data storage engine, and responsive to a selection of the second data storage format, performing the write operation using a second data storage engine. According to another aspect, a database system for storing data in an optimal format is provided comprising an application programming interface configured to receive, from a computer system, a request to perform a write operation, wherein the request does not specify a data storage format, at least one storage component configured to store a plurality of data records, a first storage engine configured to store the plurality of data records in a first format, a second storage engine configured to store the plurality of data records in a second format, and a storage engine selector for selectively executing one of the first storage engine or the second storage engine to perform the write operation. According to one embodiment, system further comprises a database monitor configured to track performance information about the database system, and a memory configured to store analytics data comprising performance information tracked by the database monitor. According to another embodiment, the system further comprises a configuration database adapted to stored configuration metadata about the database, the configuration metadata including at least one of an association between a storage engine and one of the at least one storage components.

According to another aspect of the present invention, a database system for storing data in an optimal format is provided comprising an application programming interface configured to receive, from a computer system, a request to perform a write operation, wherein the request does not specify a data storage format, a replica set comprising a primary node having a first storage component and a secondary node having a second storage component, the first storage component and the second storage component configured to store a plurality of records, a first storage engine configured to store the plurality of data records in a first format in the first storage component, and a second storage engine configured to store the plurality of data records in a second format in the second storage component. According to one embodiment, the system further comprises a storage engine selector for selectively executing one of the first storage engine or the second storage engine to perform the write operation.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure.

In the figures:

FIG. 14 is a table showing example encodings, according to one embodiment.

DETAILED DESCRIPTION

Figure 1:
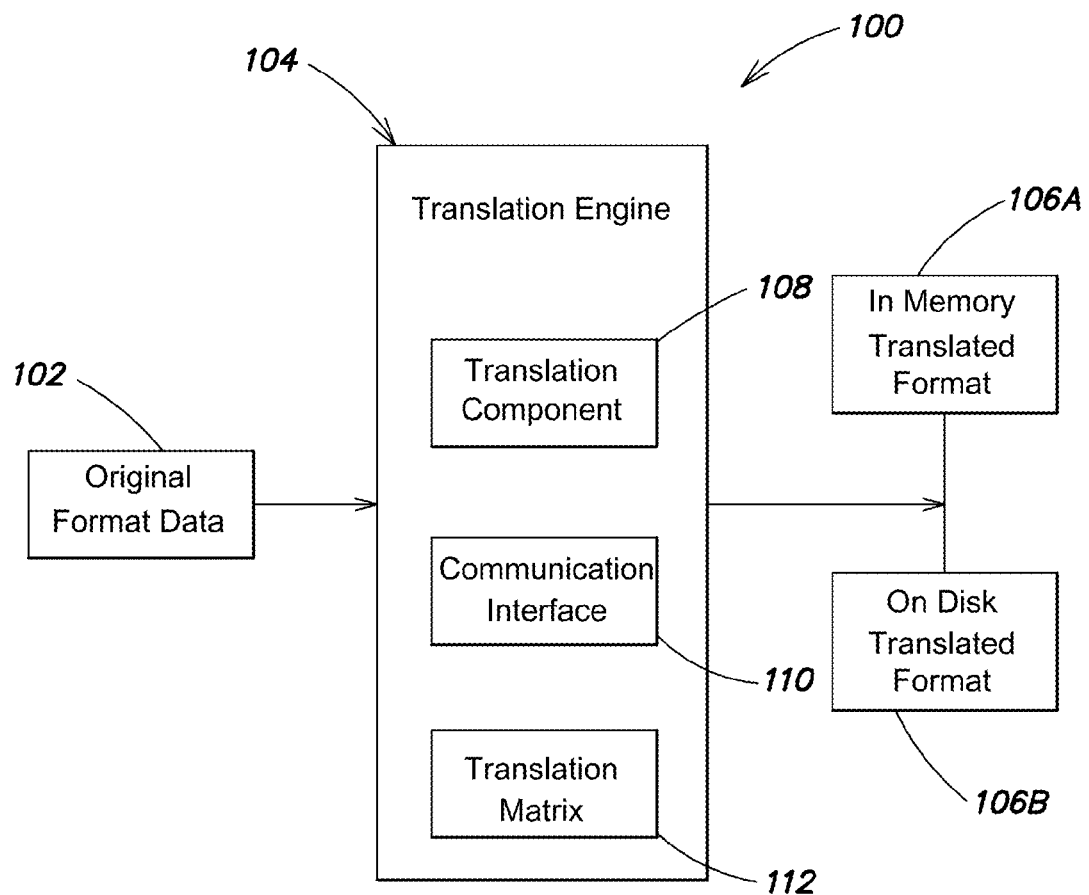
FIG. 1 illustrates a block diagram of an example architecture for a translation subsystem, according to one embodiment.

Stated broadly, various aspects are directed to systems and method for data conversion to improve efficiency in comparison operations. Improving comparison efficiency in the distributed database yields an improved computer system. For example, in any database, improved comparisons of queried data against index data fields yields increased efficiency in data retrieval. According to one aspect, efficiency of a database query operation can be significantly improved by translating index data into a form susceptible to byte by byte comparison, rather that requiring execution of complicated comparison logic. For example, index data can be converted and maintained in memory for use in comparisons against incoming data requests. According to some embodiments, non-relational databases and/or databases that organize data without enforcing a schema often require complex comparison logic to implement indexes. Thus, translated index data enables significant improvements in efficiency where non-relational databases are used.

According to one embodiment, a translation component is configured to operate on document encoded data to translate the document encoded data into a canonical format comprising a plurality of canonical types. The canonical types are each given a unique definition, and are associated with respective database types from the untranslated data. In further embodiments, the canonical types can also be defined wherein the value for a canonical type is dependent on the value of the data being encoded. In some implementations, having value dependent canonical types enables more compact encoding.

According to one embodiment, the translation component is further configured to preserve any ordering of the document encoded data, such that the translated canonical types fold together into an ordered byte stream. In some embodiments, the ordered byte stream can be used for byte by byte comparison more efficiently than other comparison logic. According to another embodiment, the translation component is configured to accept any storage format of data (e.g., column store, row store, LSM tree, etc. and data from any storage engine, WIREDTIGER, MMAP, etc.) and translate that data into a byte stream to enable efficient comparison. For example, when executing searches (or any data retrieval operation) and using the translated data to provide comparisons (e.g., translated index data to speed lookup) on distributed databases, byte by byte comparisons are executed more efficiently. It is realized that there can be a trade-off based on the translation costs and the increased efficiency in comparison. The more comparisons that can be executed for each instance of the translation cost, the greater the improvement in efficiency of the system.

In various embodiments, the translation component can be implemented as part of a database API and/or as part of a storage engine API. In other embodiments, the APIs can interact with a separate translation component. And in yet other embodiments, storage engines can include translation components, and the storage engines can determine when translation would like yield improvements in operational efficiency. In one example, the storage engine and/or storage API can determine a likelihood of increased efficiency based on historic and/or expected data operations and volume, data structure and characteristics, and other factors.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, any combination of, and all of the described terms.

FIG. 1 is an example of a translation subsystem 100, according to one embodiment. The translation subsystem 100 can include a translation engine 104 that is configured to receive data 102 in an original data format (e.g., document encoded data, row/column store data, LSM tree, etc.) and translate the original data into a canonical format. In some embodiments, the translation subsystem 100 can include a separate translation engine 104 and/or component 108 configured to perform the operations to translate the original data 102 into a canonical format (e.g., output 106A and/or 106B). In other embodiments, the translation subsystem 100 can execute the translation operation without or without the translation engine 104 and component 108.

According to one embodiment, the translation subsystem can include a communication interface 110 configured to communicate with various components of a distributed database. In one example, the communication interface 110 is configured to interact with a storage API to retrieve original data 102, and further to communicate the translated data (e.g., in memory translated format data 106A and/or translated data 106B) to write translated data to disk. The communication managed by the communication interface 110 can occur through a storage API or through a storage engine. In other embodiments, a database API for managing a distributed database and/or managing data operations can communicate with the communication interface 110 to provide access to original format data 102 and/or receive translated data 106A and/or 106B.

In some embodiments, the translation subsystem 100 includes a translation matrix 112. The translation subsystem, engine, and/or component can access canonical format definitions stored and/or mapped by the translation matrix. The canonical format definitions are configured to provide a mapping between all original data types used in a distributed database (e.g., a MONGODB database) and a plurality of uniquely identified canonical data types. In some examples, each original data type is mapped to at least one uniquely identified canonical data type. In further examples, an original data type can map to a plurality of uniquely identified canonical types based on, for example, data values associated with the original data.

According to various embodiments, special translation values can be reserved. For example, the translation matrix 112 can include reserved values for a maximum and minimum data values. The maximum and minimum data values can be defined in the translation matrix for encoding special values in the original data (e.g., null values). According to some embodiments, encoding and ordering associated with null values can be specifically tailored to enable proper ordering of variable length data. Further the complexities of document based data, where arrays are permitted and yet other documents can be embedded within a document, can involve use of reserved values to preserver ordering of the document data. Generally, various embodiments of the translation matrix include defining a type bit at the beginning of a data record, value encoding and in some embodiments an end record indicator. In some embodiments, the translation matrix is configured to defined a comparison direction for the translation data. Comparison ordering can be specified by special flags, special bits, and/or by flipping bits in the encoded data, optionally with a flag indicating the bits have been flipped.

In further embodiments, the translation component and/or matrix must be configured to handle variable length data, and preserve proper comparison order of translated variable length data. In this environment, various embodiments accommodate variable length data without utilization of length prefixes. In one example, reserve byte values are encoded in the data to enable beginning and end of records identifications. Additional examples of special/reserved values are described in greater detail below.

In some embodiments, the translation matrix 112 is further configured to encode translation values that can be used to recover the original type and data from translated information. In some embodiments, the translation matrix includes rules to add additional fields to translated data to disambiguate any translation and enable recovery of the original data and type.

Example Translation and Environment

According to one embodiment, the translation subsystem 100 can be implemented to improved time efficiency of data operations in a distributed database. For example, a MONGODB implementation can include the translation subsystem 100, and execute data comparisons using translated data. According to one embodiment, the translation system 100 and/or matrix 112 define a plurality of canonical data types that map existing or original data to translated types and values. For example, a series of mapping defined by the translation subsystem or matrix can be defined to map original data and data types to the following canonical types, which may include value based encodings.

Example Canonical types

Discussed in greater detail below, one embodiment illustrates a number of mapping examples where the encoding/translation is configured to determine a canonical byte (for example, stored as a unsigned byte) based on analyzing the type of the input data to be mapped.

In other embodiments, encoding compaction can be optimized and additional information beyond the type of the input data can be considered in mapping. For example, mappings can be defined that permit the "canonical type" byte to depend on the value of input data, and that relationship can be exploited by the system to enable additional storage size optimization (e.g., better compaction of data).

Example Translation Matrix: To illustrate with an example, a MONGODB database includes a number of data types that are mapped to the following 18 canonical data types specified by a byte value or byte range, wherein the mappings include an undefined type to handle any unmapped data. In one embodiment, the canonical type is assigned a name and an encoded value: the translation matrix 112 can store a field name followed by a type byte value.

Translation Matrix Example Types:
MinKey: 10
Undefined: 15
EOO ("end of object"): 20
Null: 20
Numerics: 30-51
String: 60
Symbol: 60
Object: 70 (optional embodiments include a special type for empty)
Array: 80 (optional embodiments include a special type for empty)
BinData (binary data): 90
OID ("object ID"): 100
Bool: 110-111
Date: 120
Timestamp: 130
Regex ("regular expression"): 140
DBRef (common format and type to encode relationships among documents): 150
Code: 160
CodeWScope: 170
MaxKey: 240 (not 255)

According to one embodiment, once input or original data types and/or values are translated using the translation matrix, the following encoding formats result (generally–Encoding Format=Canonical Type byte+Encoded Values). In other embodiments, the encoding format can be in any order (e.g., encoded values+canonical type byte). The encoding formats can be described in groups based on various properties. For example, some of the canonical data types are valueless types: MinKey, MaxKey, EOO, Undefined, and Null. For types having associated values, one embodiment defines the following encoding formats based on the input values:

Bool
   True: assign 111 for type byte;
   False: assign 110 for type byte;
Date
   Big endian encode input value/type—with high-bit flipped to enable signed comparisons (this encoding format is equivalent to a bias encoding, specifically, adding 2^63 with wrapping overflow);
Timestamp
   Big endian (unsigned comparisons) input value/type;
OID (object ID)
   copy the 12 bytes for the OID from input;
String-like (String, Symbol, Code)
   Copy body of string with NUL byte replaced with "\x00\xFF" sequence;
   In some examples, the NUL replacement ensures that "a" sorts before "a\0a" regardless of what follows "a". Various translation matrixes are implemented to require that no types use the bytes 00 or FF to ensure proper ordering;
   Followed by terminating 0×00 byte;
CodeWScope*
   Copy Code—as identified above in "string-like" translation (modified to exclude extra 0×00);
   Scope encoding follows definition of "Object" translation below;
BinData
   Encode size
      one byte if <255
      0×FF followed by 4-byte big-endian size
   subtype byte
   data
Regex
   copy input pattern along with encode of NUL
   encode each flag along with encode of NUL
DBRef
   Encode input using big endian encoding of namespace size
   Encode namespace without NUL
   Encode 12 bytes of OID defined in input
Array
   Encode values within the array back-to-back with each value terminating in a 0×00 byte
Object
   For each kv pair in the input object:
      Encode canonical type from list above (1 byte)
         For types that can be represented with a range of types, use the lowest type value (e.g., numeric lowest).
         Encode fieldName along with NUL
         encoded value as described for each respective type and/or value contained in the object
      Terminating 0×00 byte According to some embodiments, mapping of number values to a type byte can be based on the magnitude of the number being translated. In one example the following types bytes are used based on the magnitude of the input data:
   Number Examples (format<input type/value>:<canonical type byte assigned>)
   NaN: 30 ("NaN"=not a number or where an undefined or un-representable value is encountered—especially in floating-point calculations)
   NegativeLargeDouble: 31 (numbers <=-2**63)
   Negative8ByteInt: 32
   Negative7ByteInt: 33
   Negative6ByteInt: 34
   Negative5ByteInt: 35
   Negative4ByteInt: 36
   Negative3ByteInt: 37
   Negative2ByteInt: 38
   Negative1ByteInt: 39
   NegativeSmallDouble: 40 (numbers between 0 and −1 exclusive)
   Zero: 41
   PositiveSmallDouble: 42 (numbers between 0 and 1 exclusive)
   Positive1ByteInt: 43
   Positive2ByteInt: 44
   Positive3ByteInt: 45
   Positive4ByteInt: 46
   Positive5ByteInt: 47
   Positive6ByteInt: 48
   Positive7ByteInt: 49
   Positive8ByteInt: 50
   PositiveLargeDouble: 51 (numbers >=2**63)

In some embodiments, encoding of numeric values includes additional encoding translation or executions. For example, with negative numbers, all bytes after the type byte (i.e., translation of the input value) are written with their bits flipped.

Additional encoding examples include processing negative numbers as follow:
   Determine if number is 0 or NaN ("NaN"=not a number);
   Only the type byte is encoded;
   Determine if abs(number) is between 0 and 1 or is >=2**63;
   use the Double type byte corresponding to (number) sign and magnitude;
   Encode the raw double (e.g., IEEE 754 specification of double) (from above) in big endian order with original sign bit;
   Else
   left shift the positive integer portion of the number by 1 bit;
   If there was a fractional part to the number set the low bit to 1;
   Use the smallest Int type byte that can represent the resulting unsigned integer;
   Write the resulting unsigned integer in big-endian order in as few bytes as possible;
   If there was a fractional part:
      Zero out all bits of the raw double (e.g., IEE 754 double) that are not part of the fractional component;
      Write the bytes of the mantissa that include fractional information in big endian order.

According to further embodiments, additional examples of numeric processing include additional example encoding rules. In one example, encoding of a recordId is configured such that the encoding specifies the full length of the input starting from the last byte, without knowing where the first byte is. In one embodiment, the system defines the encoding to place a number (N) between 0 and 7 in both the high 3 bits of the first byte and the low 3 bits of the last byte or the encoded information. "N" is the number of bytes between the first and last byte (i.e. where total bytes is N+2). The remaining bits of the first and last bytes are combined with the bits of the in-between bytes to store a 64-bit RecordId in big-endian order.

In some examples, the full length specification is not used to encode negative RecordId. Ignoring RecordId with negative values enables use of maximum encoding space to positive RecordIds. In some embodiments, the recordID encoding is tailored to properties of the data being translated. In an index data example, only positive recordID values are allowed to be stored. Thus the optimization of ignoring negative recordID can be implemented in such settings. In other implementations, the recordID encoding can include negative flag, at the cost of using some space to encode the flag. In index translations, and in most MONGODB settings, the only negative RecordId that should be encountered is RecordId::min( ). In some examples, RecordId::min( ) can safely be encoded as 0 (e.g., as shown in Appendix A and example code). Appendix A provides example source code for keystring encoding and/or comparison. The example provided include encoding and comparison of non-hybrid encodings. Other implementations can include hybrid encodings into the source example shown. Additional source code examples in Appendix A include hybrid encoding and comparisons.

In the MONGODB database environment, various storage engines can constrain the values assigned to recordID. For example, the known WIRED TIGER ("WT") storage engine uses monotonically increasing values for recordID, thus the translation component tailored for the WT engine can implement the preceding optimization. In other embodiments, the translation component can detect and executed the encoding optimization based on identifying a storage engine being used, or through analysis of properties of the recordId, or based on validation rules on the database that constrain recordID to positive values.

Table I illustrates the implementation of the above positive encoding only, and specifies the total number of bytes, bits provided for encoding, and a maximum size of the input recordID.

TABLE I

| Total bytes | Bits provided | Maximum RecordId |
| --- | --- | --- |
| 2 | 10 | 1023 |
| 3 | 18 | 262, 143 |
| 4 | 26 | 67, 108, 863 |
| 5 | 34 | 17, 179, 869, 183 |
| 6 | 42 | 4, 398, 046, 511, 103 |
| 7 | 50 | 1, 125, 899, 906, 842, 623 |
| 8 | 58 | 288, 230, 376, 151, 711, 743 |
| 9 | 66 (only 63 are used) | Full range |

In other embodiment, the translation component and/or translation matrix can be tailored to other distributed databases, other storage engines, and the translation component can be configured to analyze properties of the database/data being translated to determine operating characteristics.

According to another aspect, comparison functions can be further optimized to support both binary and decimal floating point numbers in the same format. Executions implementing the new format enable greater flexibility without giving up resources for size or speed of the encoding for the existing types. For example, under conventional approaches comparing decimal floating point numbers with binary floating point numbers can be hard and computationally burdensome. Even under ideal conditions, systems execute significant computations to determine which of $7142*10^{266}$ and $12469052622144339*2^{833}$ is larger, yet when executing comparisons of the same numbers post translation (e.g., making binary comparison of their KeyString encodings (i.e., translated encodings)) the computational burden is trivial. By executing the difficult computations (e.g., the translations) the computation intensive work is done in the encoding, and every comparison of those translated values proceeds at orders of magnitude greater speed and with significantly less computational burden.

According to one embodiment, the design for a translation matrix can include the following encodings for binary/decimal to use in comparisons:

hybrid binary/decimal encoding—where the most significant part of the encoding is binary (e.g., as would be done without the hybrid encoding) and with a decimal continuation for decimal numbers that cannot be exactly represented in binary;

use of a 2-bit decimal continuation indicator that allows omitting the decimal continuation for binary numbers (e.g., indicator indicating presence or absence of continuation values), while encoding decimal numbers with a threshold number of significant digits (e.g., 15 significant digits), configured to preserve correct interleaving with more precise values;

optimized encoding method for common decimal numbers with at most 15 decimal digits avoiding overhead in the value encoding compared to binary numbers;

optimized encoding method for high-precision decimal numbers that limits the decimal continuation to 8 bytes for numbers with more than 15 significant digits;

optimized TypeBits encoding that allows for bit-exact reconstruction of Decimal128 numbers, which can be used in the execution of covered index queries, and further configured to preserve trailing zeros (e.g., allowing for comparisons of numbers that otherwise compare equal).

According to some embodiments, all numeric types, including decimal128, can be implemented in the same index while providing ordering by true numeric value. For example, a MongoDB database can include translation matrixes with hybrid binary/decimal encoding. Discussed in greater details below are process(es) for efficiently encoding binary/decimal numbers.

According to one embodiment, a goal is to minimize impact and overhead for non-decimal types, while being able to encode all finite IEEE 754-2008 decimal128 values, ±Infinity and a single NaN value. Assuming positive values for clarity in describing the following encoding approach, a decimal128 value d is encoded by the largest binary double b, where b≤d, followed by one or two bits for a Decimal Continuation Marker (DCM) indicating whether the decimal can be recovered from the double or whether a decimal continuation follows.

According to some embodiment, various databases can be configured to recognize and/or support new translation models (e.g., including hybrid encoding of binary/decimal numbers). In one example, a "keyStringVersion" data field can be implemented to provide a server/database manager parameter that enables accept/reject functionality for new encoding types. For example, the keystringversion data field can be incorporated into a BSONCollectionCatalogEntry:: IndexMetaData which can be accessed by various components to control the behavior of various translation matrixes. For example, the data field can be used to enable accept/rejection functions for various data types. In another example, a server parameter can be defined (e.g., enableBSON1_1) to provide the server information and control or prevent accepting new types Decimal128 and High Precision Date (HPD). Various data fields and behavior can be defined to control when the new data types can be used.

For example, a database can specify a "KVCollectionCatalogEntry::prepareForIndexBuild," field and store on the database a default of "keyStringVersion" "==2" if "enableBSON1_1" is set to true, and to store a value for "keyStringVersion==1," otherwise. The database manager can be configured to generate an error or report invalid values if a keystring version does not support, for example, hybrid data encoding. For example, the manager can execute functions to monitor per-operation user errors that reflect any fatal errors (e.g., "uassert"—monitoring program)—including operations attempting to index a decimal or HPD value in an index with keyStringVersion <2.

Example of Compact Encoding for Double

According to one embodiment, to accommodate new decimal encodings, system changes reflect that decimal values need to collate with integer and binary floating point values. For double, the encoding can be defined as 2 bits larger. The result includes turning some 7-byte encodings into 8-byte encodings. For LargeDouble and SmallDouble cases, the high bit of the exponent can be implied to be 1 and 0, respectively. In various embodiments, the sign bit is always 0 as encoding functions already encodes the sign separately from the magnitude. Thus, doubles can be encoded in eight value bytes, while leaving a bit or two for identifying the kind of decimal continuation required.

Example Decimal Continuations Encoding

According to various embodiments, each 15-digit decimal number between DBL_MIN and DBL_MAX (which excludes subnormals) truncates to a unique double precision number. Because each decimal128 number has at most 34 digits, at most $10^{34-15} = 10^{19}$ decimal128 numbers truncate to the same double precision number. As $10^{19} < 2^{64}$, a 64-bit continuation is sufficient to encode the remaining 19 digits. Further, as the large majority of decimals are expected to have at most 15 digits, a special optimization is made to encode such values using at most 8 bytes, halving storage requirements. For every positive decimal value D define D' as D truncated to 15 decimal digits of precision (19 trailing zeros, D'≤D), and B as the largest binary double such that B≤D. In various embodiments, the translation matrix only encodes positive values directly. For example, negative numbers are encoded by special type bytes and bit flipping the positive encoding. Shown in Table II, are decimal continuation markers and the condition specified by the encoding.

TABLE II

| Decimal Continuation Marker (DCM) | Condition | Notes |
|---|---|---|
| 00 | D' ≤ B = D | the decimal is equal to the double |
| 01 | D' ≤ B < D | a continuation is needed |

TABLE II-continued

| Decimal Continuation Marker (DCM) | Condition | Notes |
|---|---|---|
| 10 | B < D' = D | the double rounded up to a 15-digit decimal & yields the exact decimal |
| 11 | B < D' < D | a continuation is needed |

According to one embodiment, to ensure correct sorting with integers that have more than 53 significant bits, decimal values with a magnitude exceeding 2^53 either use an 8-byte integer encoding with a single bit to indicate a decimal continuation, or a 7-byte integer encoding followed by a byte with the value 0×3 (the DCM) and a decimal continuation.

The decimal continuation can be computed as follows:

1. Convert the encoded integer or double to decimal rounding away from zero
2. Normalize this decimal to have the smallest unbiased exponent E possible
3. Compute the absolute difference D between this value and the original decimal
4. Store the value $N = D/10^E$ as unsigned 64-bit big-endian integer Example String-Comparable Decimal128 Encoding According to one embodiment, for finite, strictly positive normalized decimal128 numbers, the string of bytes of the (big-endian) representation sorts the same way as the magnitude of the numbers. For example, normalization can be achieved by adding a 0 with the smallest exponent, $0E^6176$—see Table III.

TABLE III

| Sign | Combination Field | Coefficient (cont'd) |
|---|---|---|
| 1 bit | 17 bits | 110 bits |
| 0 | 00xxxxxxxxxxxxxccc | ccccccccc . . . |
| 0 | 01xxxxxxxxxxxxxccc | ccccccccccccccccccccccccccc |
| 0 | 10xxxxxxxxxxxxxccc | |

Example Encoding of Numerical Values

According to some embodiments, encoding for numerical values can be defined as shown in Table IV below where double values can have an upper boundary of 8 bytes (excluding the CType byte).

TABLE IV

| CType | Name (abbrev.) | msb | Range | Bytes | Notes (lsb = least significant bit, msb = most significant bit) |
|---|---|---|---|---|---|
| 30 | NaN | | | 0 | supports single NaN implementations |
| 31 | NegativeLargeDouble | | $[-\text{Inf}, -2^{63}]$ | 8 or 16 | Like 51. Use absolute value and flip bits. |
| 32 | Negative8ByteInt | | $<-2^{63}, -2^{55}]$ | 8 or 16 | Like 50. |
| 33 | Negative7ByteInt | | $<-2^{55}, -2^{47}]$ | 7, 8 or 16 | Like 49. |
| . | . | | . | | . |
| . | . | | . | | . |
| . | . | | . | | . |
| 39 | Negative1ByteInt | | $<-2^7, -1]$ | 1, 8 or 16 | Like 43. |
| 40 | NegativeSmallDouble | | $<-1, 0>$ | 8 or 16 | Like 42. |
| 41 | Zero | | 0 | 0 | no change (but see TypeBits) |
| 42 | PositiveSmallDouble | 00 | $<0, 2^{-1074}>$ | 16 | Read 16 bytes. The two msb are 0, and the entire 128 bit value encodes a big-endian decimal128. |

TABLE IV-continued

| CType | Name (abbrev.) | msb | Range | Bytes | Notes (lsb = least significant bit, msb = most significant bit) |
|---|---|---|---|---|---|
| | | 01 10 | $[2^{-1074}, 2^{-255}>$ | 8 or 16 | Read 8 bytes. The lsb (least significant bit indicates whether an 8-byte decimal continuation follows. Subtracting $2^{62}$ and shift one right to obtain a 63-bit value. This encodes a positive double-precision number, scaled by $2^{256}$ to avoid subnormal numbers with less precision. |
| | | 11 | $[2^{-255}, 1>$ | 8 or 16 | The two msb are set, the two least significant bits are the DCM. The double is found by shifting the entire value two bits to the right. The resulting double will have both msbs equal to 0 indicating a positive number with a negative exponent. |
| 43 | Positive1ByteInt | | $[1, 2^7>$ | 1, 8 or 16 | Read 1 byte as binary integer shifted left 1 bit. The lsb indicates a 7-byte binary fraction follows, the low two bits of which are the DCM. |
| . | . | | . | . | . |
| . | . | | . | . | . |
| . | . | | . | . | . |
| 49 | Positive7ByteInt | | $[247, 255>$ | 7, 8 or 16 | Read 7 bytes as binary integer shifted left 1 bit. The lsb indicates a 1-byte binary fraction follows, the low two bits of which are the DCM. |
| 50 | Positive8ByteInt | | $[255, 263>$ | 8 or 16 | Read 8 bytes as binary integer shifted left 1 bit. The lsb indicates that a 64-bit decimal continuation follows, representing the fractional part of the decimal 128 value. (double of this magnitude must be integer, so a fractional part implies decimal) |
| 51 | PositiveLargeDouble | 0 | $[2^{63}, 2^{1024}-2^{971}]$* | 8 or 16 | Read 8 bytes. The msb is clear, a 62 bit LargeDouble encoding follows, with the final bit indicating whether a 64-bit decimal continuation follows. * The end of the range is DBL_MAX |
| | PositiveLargeDouble | 1 | $<2^{1024}-2971, 10^{6144}>$ | 16 | The msb is set. The lower 127 bits are a decimal 128 number without sign. |
| | PositiveLargeDouble | 1 | +Inf | 8 | All bits set |

In some embodiments, for Negative7ByteInt and Positive7ByteInt, the non-zero fraction bits are added until the total number of significant bits equals 53. Unused trailing bits (before the DCM) can be set to zero. For decimals with a magnitude M such that 0<M<DBL_MIN, the system computes the scaled double by scaling in the decimal domain using $2^{256}$ rounded down to the nearest decimal128 value and then rounding down to the nearest double. The system stores the value with the largest magnitude of this value and value of the decimal rounded down to double and then scaled by $2^{256}$.

Example of TypeBits: Non-Zero Numeric (e.g., CType 30-40, 42-51—(See Table IV))

For non-negative numbers, up to 34 representations have the same numeric value (differing in precision), so an extra 6 type bits can be used in various embodiments, to recover the original representation—resulting in 8 bits (which may not be byte aligned) of type info per decimal value. In one implementation, the system is configured to store the low bits, rather than an offset from a normalized form, as that will often save work in determining what the exponent of the normalized form is—See Table V.

TABLE V

| Numerical Type | bit 0-1 | bit 2-7 (kDecimal only) |
|---|---|---|
| kInt | 0x0 | |
| kDouble | 0x1 | |
| kLong | 0x2 | |
| kDecimal | 0x3 | 0-63, low 6 bits of decimal exponent |

Example TypeBits: Zero Numeric (e.g., CType 41—shown above in Table IV)

Because both positive and negative zeros are possible for all positive and negative exponents, there is a total of 2*(6143+6144)=24,574=6*2**12 zeros. To avoid expanding the number of type bits for 32-bit and 64-bit zeros and the double precision positive zero, type bit encodings starting with 0x3 have been optimized as shown below in Table VI.

TABLE VI

| Numerical Type | bit 0-1 | bit 2-4 | bit 5-17 (kDecimal only) |
| --- | --- | --- | --- |
| kInt | 0x0 | | |
| kDouble | 0x1 | | |
| kLong | 0x2 | | |
| kNegativeDoubleZero | 0x3 | 0x0 | |
| kNormalDecimalZero ("0") | | 0x1 | |
| kDecimalZero0xxx | | 0x2 | 0x0 - 0xfff |
| . | | . | . |
| . | | . | . |
| . | | . | . |
| kDecimalZero5xxx | | 0x7 | 0x0 - 0xfff |

According to various embodiments, the translation system can be implemented on any distributed database and enable efficiency improvements in data retrieval. In one example, the translation subsystem can enable efficiency improvements in using index data to speed data operations on the distributed database. The distributed database may also contain pluggable storage engines, capable of being selected to provide further enhancement to efficiency in execution. The translation subsystem can be implemented in conjunction with pluggable storage engine architectures. In some embodiment, multiple translation subsystem can be associated with multiple storage engines, wherein respective translation subsystems are tailored to respective storage engines. In other embodiments, the translation subsystem and/or translation components can be implemented as part of a database storage API. The database storage API can be configured to selectively map to different pluggable storage engines and/or translation subsystems/components.

In another embodiment, the selection of a particular storage engine and/or translation subsystem/component may be made by the storage API itself or other system components based on one or more factors. For example, a storage engine and/or translation subsystem may be selected for its expected optimal performance as compared to other storage engine options and/or translation subsystems. The factors used to recommend or select an optimal storage engine or whether or not to translate data for comparison may relate to the type and breakdown of historical operations performed on the database (e.g., volume of write requests, volume or read requests, timing of writes and/or read, sparsity of data, data types being access, data operations being run (e.g., large volume sorts on a specific collection can indicate optimization based on translating the collection, etc.), and/or the characteristics of a set of operations predicted to be performed on the database.

Figure 2:
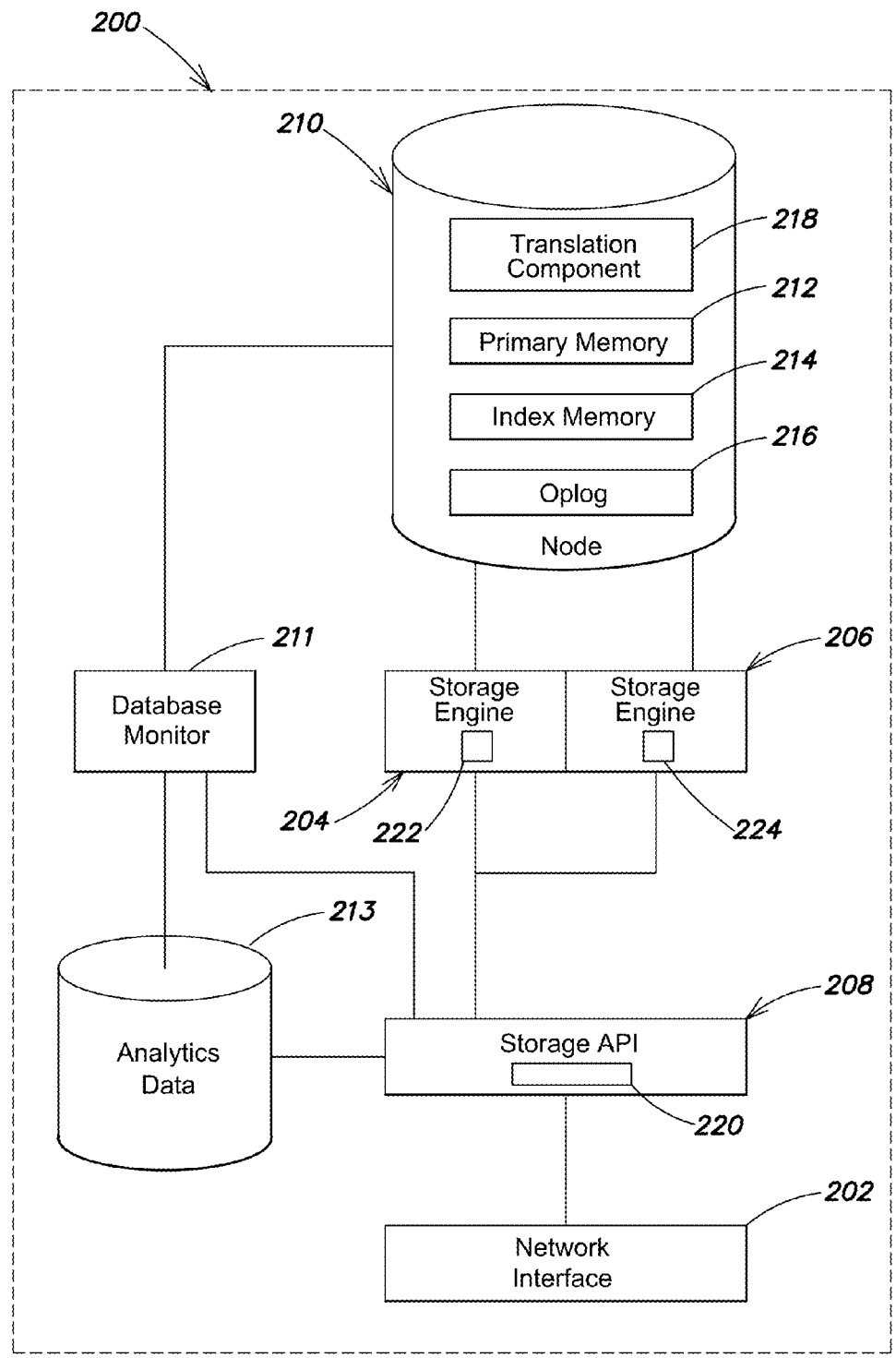
FIG. 2 illustrates a block diagram of an example architecture for a database server, according to one embodiment.

An example of a database subsystem 200 is shown in FIG. 2. The database subsystem 200 includes an interface 202 for sending and receiving information (including database requests and responses thereto) to router processes, database clients, or other components or entities in the system. In one embodiment, the backend architecture is configured to interact with any data model provided by a managed database. For example, the managed database can include a non-relational data model. In another embodiment, the data model can be implemented in the form of replica sets as described in U.S. patent appl. Ser. No. 12/977,563, which is hereby incorporated by reference in its entirety. The database subsystem 200 includes a storage application programming interface (API) 208 that receives database requests, including requests to perform read and write operations. The storage API may include a translation component 208 configured to translate stored data into a byte stream to optimize data comparisons.

For example, when a data request (e.g., write, read, etc.) operation is requested, the storage API 208 in response selectively triggers a first storage engine 204 or a second storage engine 206 configured to store data in a first data format or second data format, respectively, in node 210. As discussed in more detail below, a database monitor 211 may track a number of analytics about the database. In some embodiments, the database monitor 211 is configured to track the operations performed on the data over time, and store that information as analytics data 213. In some examples, analytic data may be stored in a separate database. In other examples, the analytics data is stored as a name collection (i.e., a logical grouping of data). These analytics may be provided to the storage API 208 and/or a translation component (e.g., 220), which relies on the analytics to selectively actuate an appropriate storage engine and/or make a determination on whether translation of comparison data will increase efficiency. For a database collection (e.g., logical grouping of database data) that stores index data, translation can be assumed to improve execution efficiency. In one embodiment, index data is translated unless the database monitor 211 generates contrary indications or post analysis by the monitor 211 indicates that the translation does not improve execution efficiency.

In one example, the database monitor 211 tracks the relative number of read and write operations performed on a collection within the database for selecting a storage engine. In another example, the database monitor 211 is configured to track any operations (e.g., reads, writes, etc.) performed on any base unit of data in the database for selecting the storage engine (e.g. 104 and 106) and/or translation component (e.g., 222 and 224).

In some embodiments, the storage API 208 uses the tracked data (e.g., analytics data) collected by the database monitor 211 and/or the analytics data 213 to select an optimal storage engine and/or translation component for a database, a collection, or a document. In one example, the storage API 208 is mapped to the selected storage engine. Where the translation component is part of the API, the translation component can translate original data into the canonical byte stream used in data comparisons. For example, the translation component can receive an index collection as input from a selected storage engine, translate, and store the translated index data in an index memory 214 on a database node 210. After the data has been translated subsequent data requests use the translated byte stream to determine if a query references indexed data. If the request references indexed data, the index association (if any) can be used to speed retrieval of that data from, for example, the primary memory 212 of the database node. The database node can track operations (e.g., writes, reads, etc.) executed against the database via an operation log 216.

In other embodiments, the translation component resides in the storage engines themselves (e.g., at 222 and 224). Translation determinations can be made by the storage engines and for example, index collections can be translated and stored into an index memory 214. In another embodiment, the translation component 218 may reside on the database node 210, and any translation of data can take place after a storage engine has been selected by the storage API and used to retrieve and/or process data.

In some embodiments, the storage API 208 uses the tracked data (e.g., analytics data) collected by a database monitor and/or the analytics data to select an optimal storage engine and/or data format for a database, a collection, or a document having the observed read/write ratio. In one example, the storage API 208 is map able to the selected storage engine.

Once a storage engine has been selected, an identifier of the selected storage engine may be stored in a location in memory or on disk; when a write operation request is received by the storage API 208, the identifier is used to identify and activate the storage engine. Alternatively, elements of the database can specify a mapping or association with a storage engine that can be manually edited, edited through an administrative interface, or automatically changed responsive to system monitoring. In other embodiments, the database monitor 211 itself is configured to determine an optimal storage engine and/or translation component based on the analytics data 213 and other aspects of the data, for example, stored in the database, database collection, or in a document. This determination may be passed to the storage API 208, or otherwise used to map the storage API 208 to a determined storage engine.

Figure 3:
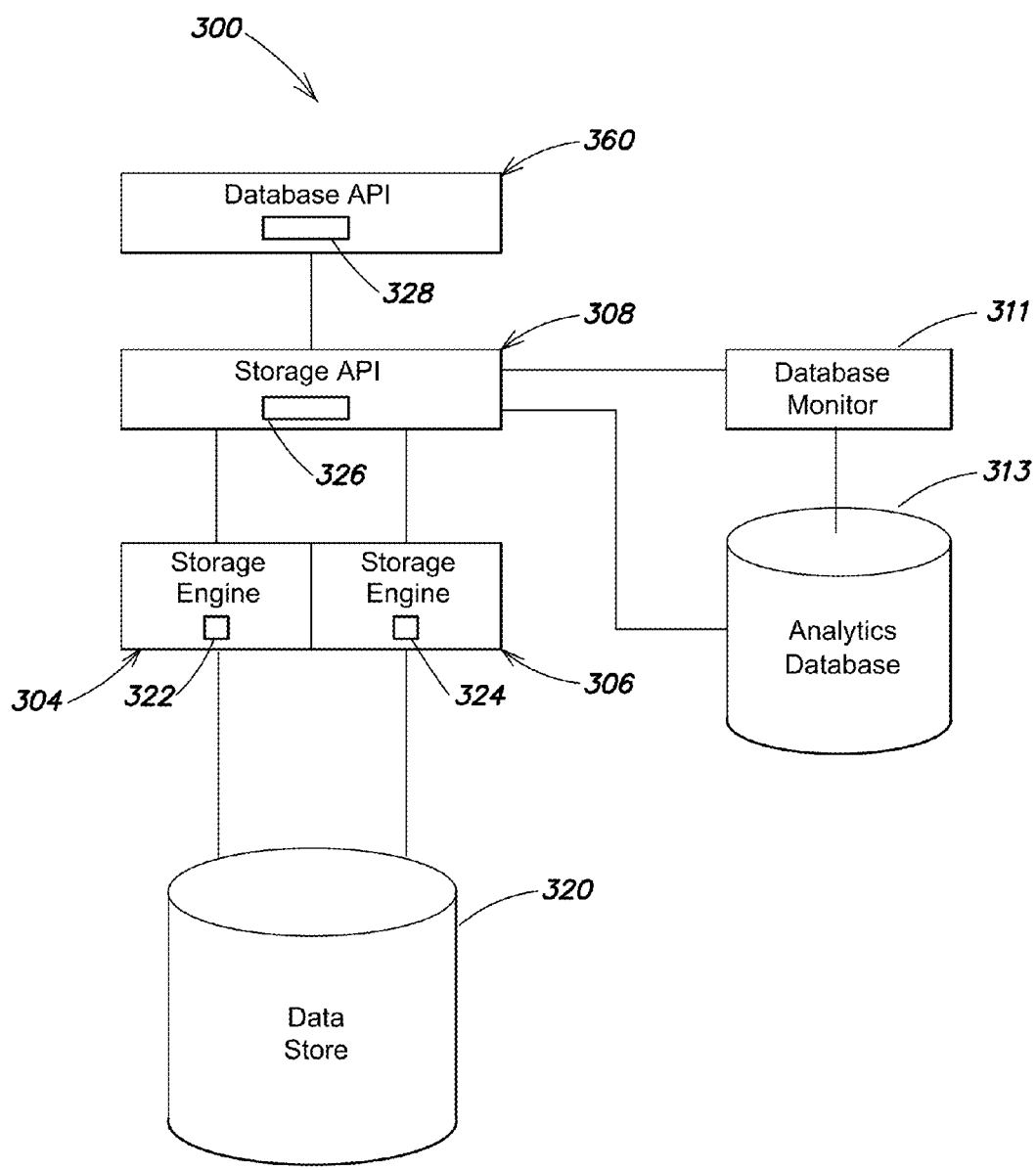
FIG. 3 illustrates a block diagram of an example architecture for a database application programming interface, according to one embodiment.

FIG. 3 shows a block diagram of an exemplary arrangement of a storage API 308, storage engines 304, 306, translation components/subsystems (e.g., 322, 324, 326, and 328) a database API 360, and other components of a managed database subsystem 300. The storage API 308 is configured to receive database operation requests from the database API 360. The database API 360, in turn, may receive instructions from an application or from a user submitting query language or otherwise providing instructions for performing operations associated with data in the managed database. In one example, the database API 360 is the primary interface through which programs and users interact with the data on the managed database subsystem 300. In one embodiment, the database API 360 passes a database request to the storage API 308. For a write operation, the storage API 308 then determines an appropriate data format in which to store the subject data of the requested operation, and calls an appropriate storage engine (e.g., first storage engine 304 or second storage engine 306) configured to store the data in the appropriate data format in a data store 320. In some embodiments, the storage API 308 and/or a database monitor 311 may determine the appropriate data format based on analytics data 313 and other aspects of the data stored. As part of a managed database becoming live to receive and respond to database request from clients, the database API 360 may retrieve and load index data into memory. The API 360 may include a translation component 328, that is configured to translate, for example, the index data into a byte stream, and the API may execute comparisons between an incoming data request and the translated data to determine if the request targets indexed data.

In an embodiment incorporating a replica set, a primary node executes a data operation (e.g., write or read) on data, then passes the operation through an associated API (e.g., the database API 360) to a storage engine API 308. The storage API 308 in turn passes the operation to a particular storage engine (e.g., storage engine 304), handling any transformation or mapping of the data as required by the storage engine. The storage engine, upon receiving the request, retrieves or stores the data in a storage format associated with the storage engine. In some embodiments, the storage engine may also perform additional transformations or mappings of the data In one example, the storage API 308 is a set of protocols, functions, and data used by other applications or APIs to interact with the database. In other words, the API in some examples, provides both the programming interface to which commands are passed, as well as the underlying data and functionality for carrying out those commands. For example, the storage API 308 may provide functions for performing operations on the database, including write operations, read operations, or commit operations. Any necessary data or variables are passed to such functions, the details of which are carried out by the functionality of the storage API 308. The storage API 308 may be configured to perform operations on the nodes (e.g., primary node or secondary nodes) of a replica set, as discussed in more detail below with respect to FIGS. 3 and 4.

In some embodiments, the storage API 308 is in direct communication with the database API 360. In other embodiments, including those in which the managed database subsystem 300 is located on a server connected by a network to other database components, the storage API 308 may be in communication with a network interface configured to receive requests from the database API 360 and pass them to the storage API 308.

The first storage engine 304 and second storage engine 306 are configured to store database data in the data store 320 in one or more data formats. The embodiments discussed in this application discuss schema-less and/or non-relational database scenarios. In some examples, data may be stored in the form of a "document" that is a collection of attribute-value associations relating to a particular entity, and in some examples, the document forms a base unit of data storage for the managed database system. Attributes in the document are similar to rows in a relational database, but do not require the same level of organization, and are therefore less subject to architectural constraints. A collection is a group of documents that can be used for a loose, logical organization of documents. It should be appreciated, however, that the concepts discussed herein are applicable to relational databases and other database formats, and this disclosure should not be construed as being limited to non-relational databases in the disclosed embodiments.

In one example, the database data may include logical organizations of subsets of database data. In one embodiment, the data is a collection of documents or other structures in a non-relational database. The data store 320 may also store index data, which may include copies of certain fields of data that are logically ordered to be searched efficiently. Each entry in the index may consist of a key-value pair that represents a document or field (i.e., the value), and provides an address or pointer to a low-level disk block address where the document or field is stored (the key). The data store 320 may also store an operation log ("oplog"), which is a chronological list of write/update operations performed on the data store during a particular time period. The oplog can be used to roll back or re-create those operations should it become necessary to do so due to a database crash or other error. The datastore 320 can include physical or on disk copies of index data. In some examples, the translation component (e.g., 322, 324, 326, and 328) translates on disk index data from a storage format to a byte stream that can be retained in memory, and used when processing database requests.

According to some embodiments, primary data, index data, or oplog data may be stored on disk in any of a number of database formats, including row store, column store, log-structured merge (LSM) tree, or otherwise, and the translation component can be used to translate the respective format into a comparison optimized byte stream.

For example, reading a particular document or field that is stored in row-store or column-store format generally involves using index information to locate and read the requested data from memory. Thus, any improvement in determining if a request targets indexed data yields significant improvement in database efficiency and translating index data from a stored format to the byte stream canonical format achieve execution efficiency.

Returning again to FIG. 2, the storage API 208 receives database write requests (e.g., from a database API (not shown)) via a network interface 202, and carries out the requested operations by selectively triggering one of the first storage engine 204 and the second storage engine 206, and potentially determining if any translation of data is likely to yield execution efficiencies. As discussed in more detail below, a database monitor 211 may track a number of analytics about the database, and the operations performed on it over time, and stores that information as analytics data 213.

One advantage of using the storage API 208 as an abstraction layer between the database API and the storage engines is that the identity and selection of a particular storage engine (and a respective data format) can be transparent to the database API and/or a user interacting with the database API. Thus, the choice and implementation of calls to an appropriate storage engine are made by the API 308, freeing the database API calls, for example, to simply request a "write" of certain data. This abstraction level allows for the implementation of the system on large filesystems that may be stored across machines in a database cluster, such as the Hadoop Filesystem offered by the Apache Software Foundation. Additionally, the abstraction layer can include translation components to identify data that can be optimized for comparison efficiencies. For example, index data can be identified, and regardless of the storage format of the storage engine, the index data can be translate into a byte stream.

Another advantage of using the storage API 208 is the ability to add, remove, or modify storage engines and/or translation components without modifying the database requests being passed to the API 208. The storage API 208 is configured to identify the available storage engines and select the appropriate one based on a one or more factors discussed below. The database API requesting write operations need not know the particulars of the storage engine selection or operation, meaning that storage engines may be embodied in pluggable modules that may be swapped out or modified.

Figure 4:
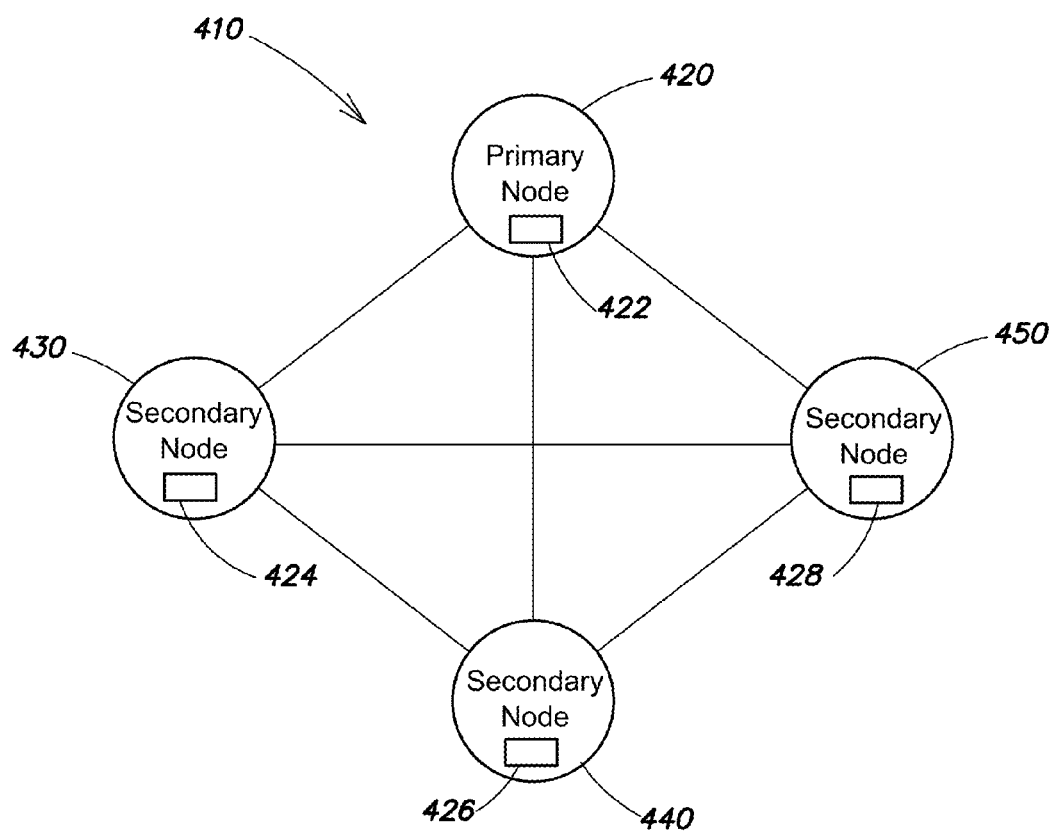
FIG. 4 illustrates a block diagram of an example architecture for a database replica set, according to one embodiment.

The embodiment shown and discussed with respect to FIG. 2 depicts a single database node 210. Yet in some embodiments, multiple database nodes may be provided and arranged in a replica set. FIG. 4 shows a block diagram of an exemplary replica set 400. Replica set 410 includes a primary node 420 and one or more secondary nodes 430, 440, 450, each of which is configured to store a dataset that has been inserted into the database. The primary node 420 may be configured to store all of the documents currently in the database, and may be considered and treated as the authoritative version of the database in the event that any conflicts or discrepancies arise, as will be discussed in more detail below. While three secondary nodes 430, 440, 450 are depicted for illustrative purposes, any number of secondary nodes may be employed, depending on cost, complexity, and data availability requirements. In a preferred embodiment, one replica set may be implemented on a single server. In other embodiments, the nodes of the replica set may be spread among two or more servers.

The primary node 420 and secondary nodes 430, 440, 450 may be configured to store data in any number of database formats or data structures as are known in the art. In one embodiment, the primary node 420 is configured to store documents or other structures associated with schema-less, dynamic schema, and/or non-relational databases. The embodiments discussed herein relate to documents of a document-based database, such as those offered by MongoDB, Inc. (of New York, N.Y. and Palo Alto, Calif.), but other data structures and arrangements are within the scope of the disclosure as well.

In one embodiment, both read and write operations may be permitted at any node (including primary node 420 or secondary nodes 430, 440, 450) in response to requests from clients. The scalability of read operations can be achieved by adding nodes and database instances. In some embodiments, the primary node 420 and/or the secondary nodes 430, 440, 450 are configured to respond to read operation requests by either performing the read operation at that node or by delegating the read request operation to another node (e.g., a particular secondary node 430). Such delegation may be performed based on load-balancing and traffic direction techniques known in the art.

In some embodiments, the database only allows write operations to be performed at the primary node 420, with the secondary nodes 430, 440, 450 disallowing write operations. In some embodiments, the primary node 420 and the secondary nodes 430, 440, 450 may operate together to form a replica set 310 that achieves eventual consistency, meaning that replication of database changes to the secondary nodes 430, 440, 450 may occur asynchronously. When write operations cease, all replica nodes of a database will eventually "converge," or become consistent. In the event of a primary node 420 failure, a secondary node 430 may assume the responsibilities of the primary node, allowing operation of the replica set to continue through the outage. This failover functionality is described in U.S. appl. Ser. No. 12/977,563, the disclosure of which is hereby incorporated by reference.

Each node in the replica set 410 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

As discussed above, translation components can be implemented on the nodes of a distributed data (e.g., on the nodes of the replica set). Each node may have its own index data based on what data is being replicated at any one or more of the database nodes. In some examples, each copy of the index data for the replica set is translated by a respective translation component (e.g., 422, 424, 426, and 428) on a respective node. Each node may include reserved memory for index data, and maintain the translated byte stream in an index memory space. Comparisons made between incoming data request can be executed more efficiently based on use of the byte stream formatted index data for comparison. The translation components can also analyze other data residing on respective nodes to determine if translation may improve execution efficiency. For example, in collection mostly used to return sorted results, translation into the canonical form byte stream may improve execution efficiency.

Figure 5:
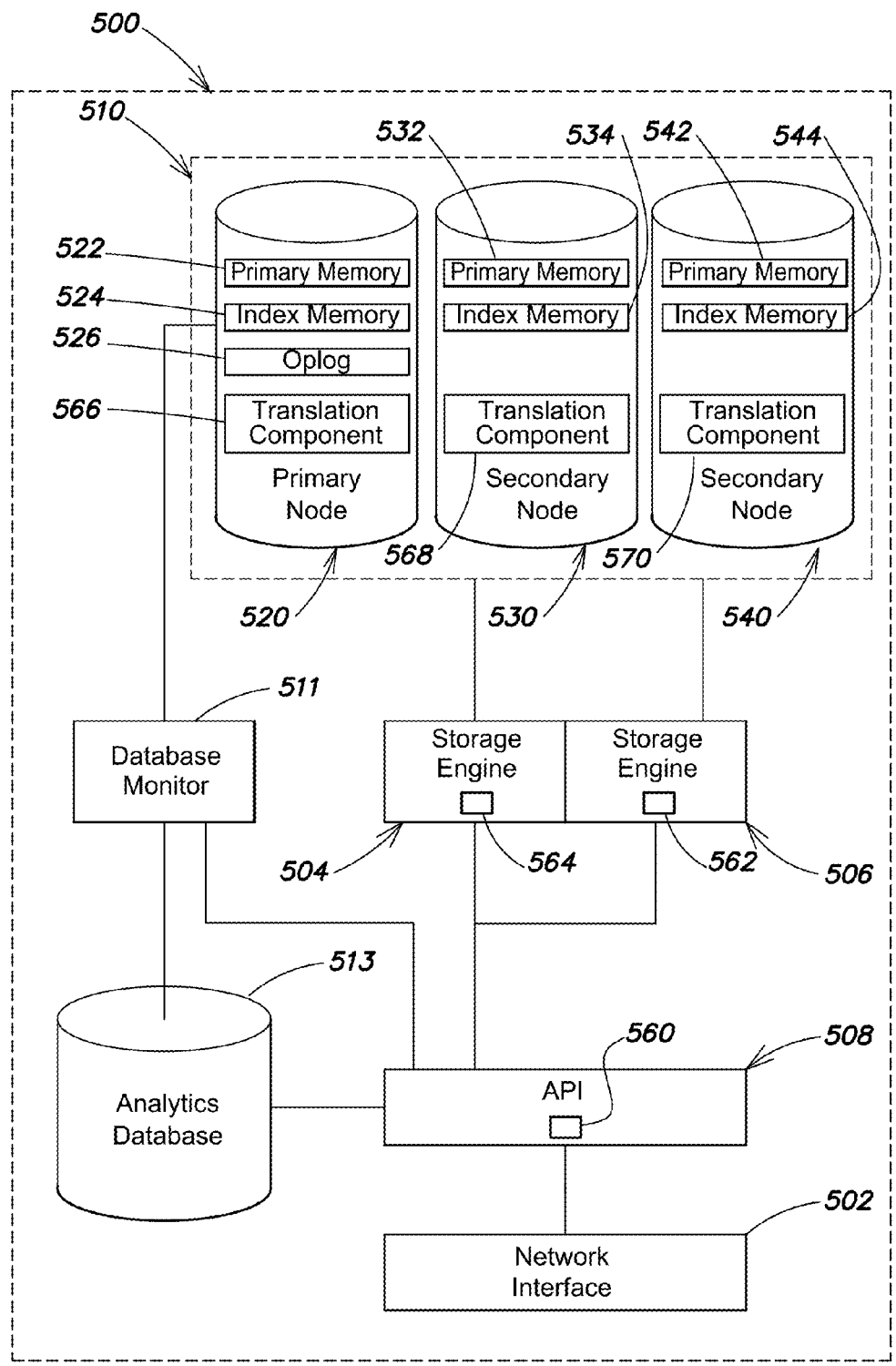
FIG. 5 illustrates a block diagram of an example architecture for a database server having a replica set, according to one embodiment.

An example of a distributed database 500 incorporating a replica set 510 is shown in FIG. 5. As can be seen, database 500 incorporates many of the elements of database subsystem 200 of FIG. 2, but also incorporates replica set 510 comprising primary node 520 and secondary nodes 530 and 540. In one example, the replica set 510 functions in much the same manner as the replica set 400 discussed with respect to FIG. 4. While only two secondary nodes 530 and 540 are shown for illustrative purposes, it will be appreciated that the number of secondary nodes may be scaled up or down as desired or necessary.

In one example, database operation requests directed to the replica set 510 may be processed by the primary node 520 and either performed by the primary node 520 or directed to a secondary node 530, 540 as appropriate. In one embodiment, both read and write operations are permitted at any node (including primary node 520 or secondary nodes 530, 540) in response to requests from clients. The scalability of read operations can be achieved by adding nodes and database instances. In some embodiments, the primary node 520 and/or the secondary nodes 530, 540 are configured to respond to read operation requests by either performing the read operation at that node or by delegating the read request operation to another node (e.g., a particular secondary node 530). Such delegation may be performed based on load-balancing and traffic direction techniques known in the art, in some examples is done via routing processes (not shown). By virtue of one or more the translation components (e.g., 560, 562, 564, 566, 568, 570), index comparisons for requested data operations can be executed against a canonical format byte stream. The byte by byte comparisons can be executed faster than complicated comparison logic required by other formats.

Figure 6:
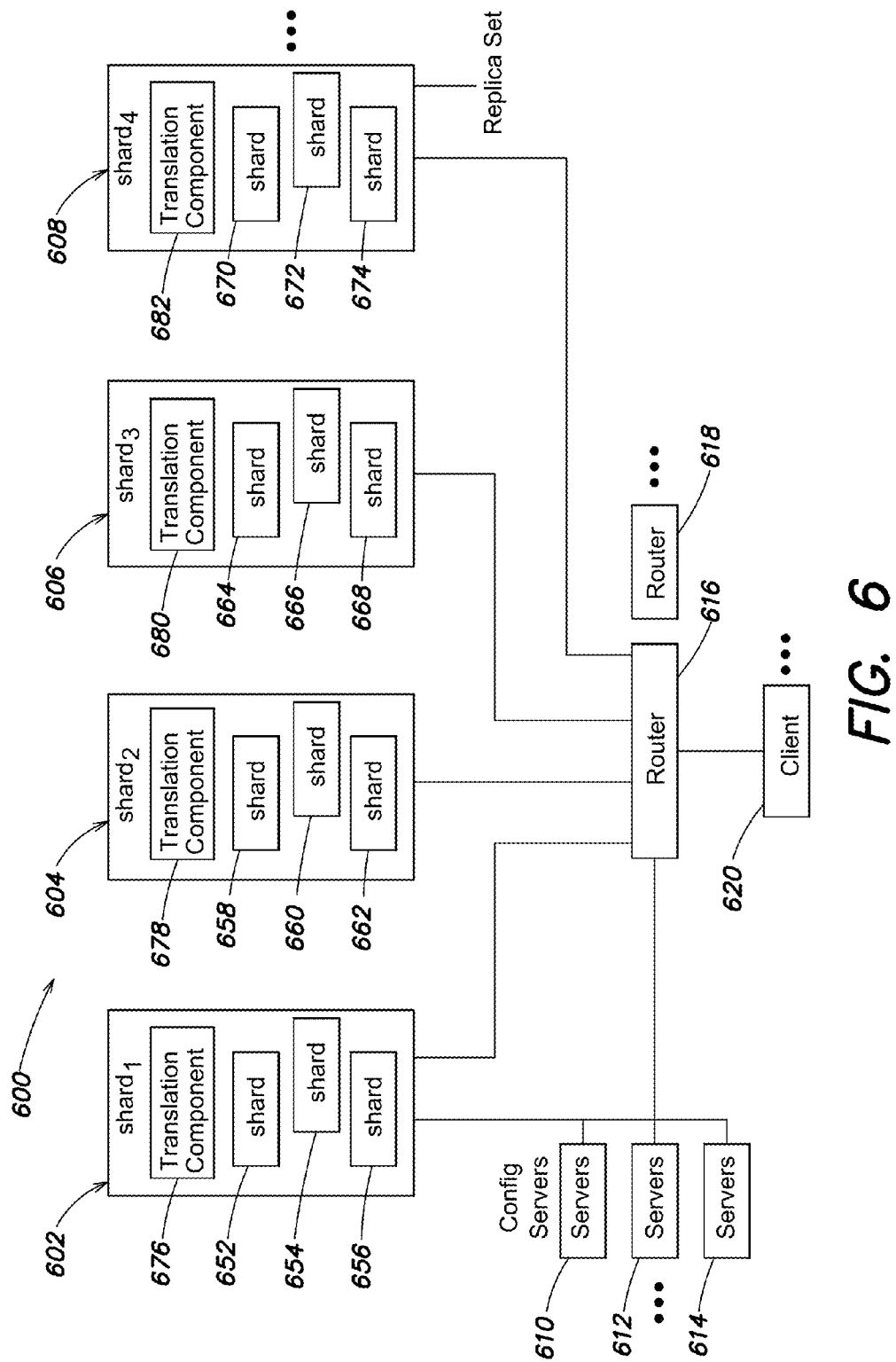
FIG. 6 illustrates a block diagram of an example architecture for a database system comprising shard servers, according to one embodiment.

Another example architecture is illustrated in FIG. 6. FIG. 6 is a block diagram of an example architecture for a distributed database system 600 that is improved by integration of pluggable database storage engines. In some embodiments, implementation of pluggable database storage engines improves execution efficiency of the managed database system 600. According to one embodiment, the distributed database system 600 has been specially configured as a shard cluster. In other embodiments, the managed database system 600 can be organized as one or more replica sets as discussed above. In some embodiments, replica sets support or provide an underlying architecture for the shard cluster.

The shard cluster is the grouping of shards that collectively represent the data within the database, with each shard responsible for storing a particular range or subset of documents in the database. A shard cluster typically comprises multiple shard servers (e.g., 602-608) hosting multiple partitions (e.g., 662-674) or shards of data, one or more configuration servers (e.g., 610-614) for metadata management, and shard router processes (e.g., 616-618). Metadata for the shard cluster can include, for example, information on the ranges of data stored in each partition, information associated with managing the shard cluster, partition counts, number of shard servers, data index information, partition size constraints, data distribution thresholds, among other options. In some embodiments, each router process (e.g., 616 and 618) can include a translation component (e.g., 676 and 678) that captures index information and transforms the index data into a comparison efficient byte stream. In other embodiments, translation components can be distributed throughout a shard cluster (e.g., at 676-682) and translation of any index data or other portion the database can be executed at and one or more of the shards 602-608.

Each shard of data (e.g., 662-674) can be configured to reside on one or more servers executing database operations for storing, retrieving, managing, and/or updating data. Configurations within a shard cluster can be defined by metadata associated with the managed database referred to as shard metadata. Shard metadata can include information on collections within a given database, the number of collections, data associated with accessing the collections, database key properties for a given collection, ranges of key values associated with a given partition, shard, and/or chunk of data within a given collections, to provide some examples.

Returning to FIG. 6, the three dots illustrated next to the system components indicate that additional instances of the system component may be included. In some embodiments, adding additional shards, configuration servers, and/or shard routing processes can increase the capacity of the managed database system. The shard router processes 616-618 handle incoming requests from clients 620 (e.g., applications, web services, user initiated requests, application protocol interfaces, etc.).

In addition to the consistency processes executed on the configuration servers, the shard cluster can be configured with various replication models to insure consistent replication of any changes to the database's metadata stored on the configuration servers. In some embodiments, the replication model for the configuration servers can be different from the replication model used within the rest of the shard cluster, for example, on the shard servers 602-608. In one embodiment, the configuration servers can be configured to perform operations under various all-or-nothing approaches while the data stored in database shards can be configured to operate under an eventual consistency model. Regardless of the replication models executed by the shard cluster, storage formats can be selected and managed independent via a storage API. Further optimizations can be realized using canonical byte stream formats for data used heavily in comparison operations (e.g., index data, sort heavy collections, etc.).

Figure 7:
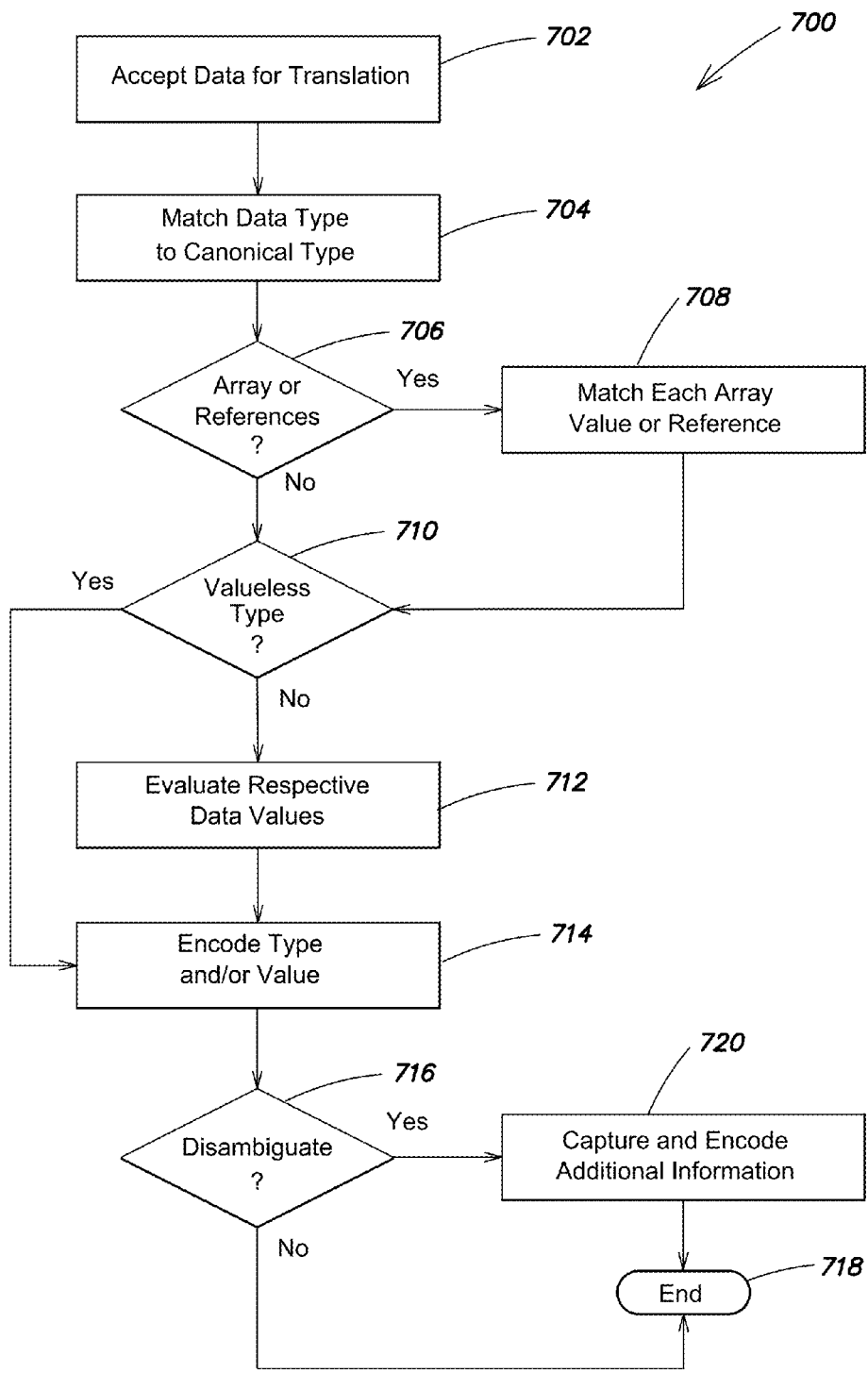
FIG. 7 illustrates an example process flow for translating input data into a canonical format, according to one embodiment.

FIG. 7 is an example process 700 for translating database data from a native format to a canonical byte format. Process 700 begins with retrieval of database data. In one example, the database can be specialized data used in management functions of the database. The specialized data can include index data used for lookup efficiency. The retrieved data is matched based on data type to a plurality of canonical data types at 704. If the retrieved data includes embedded arrays or references to other base data types 706 YES, the internal references and/or array data types are matched preserving order to canonical data types at 708. References flags can be included when internal references and/or arrays as they are being encoded, for example at 714. The reference flags or special bytes in the encoded data can facilitate maintaining proper order and can be used for reference when comparing the byte stream against other data. If there are no arrays or internal references 706 NO process 700 continues at 710, wherein valueless data types can be identified 710 and encoded according to their data type at 714. If the data type is associated with data values 710 NO, the respective data values can be evaluated at 712, and the data type and value can be encoded at 714. Optionally process 700 can continue at 716, where the ability to recover the original data type and value is desired, and additional information may be necessary to disambiguate the encode byte representation. If the original format can be recovered 716 NO, process 700 can end at 718 once each data record of the retrieved data has been processes. If additional information is necessary to recovering the original data format 716 YES, the additional data can be captured and encoded (e.g., at 720) as additional values in the byte stream or stored separately (e.g., as a reference). Once captured and encoded, process 700 ends at 718.

Figure 8:
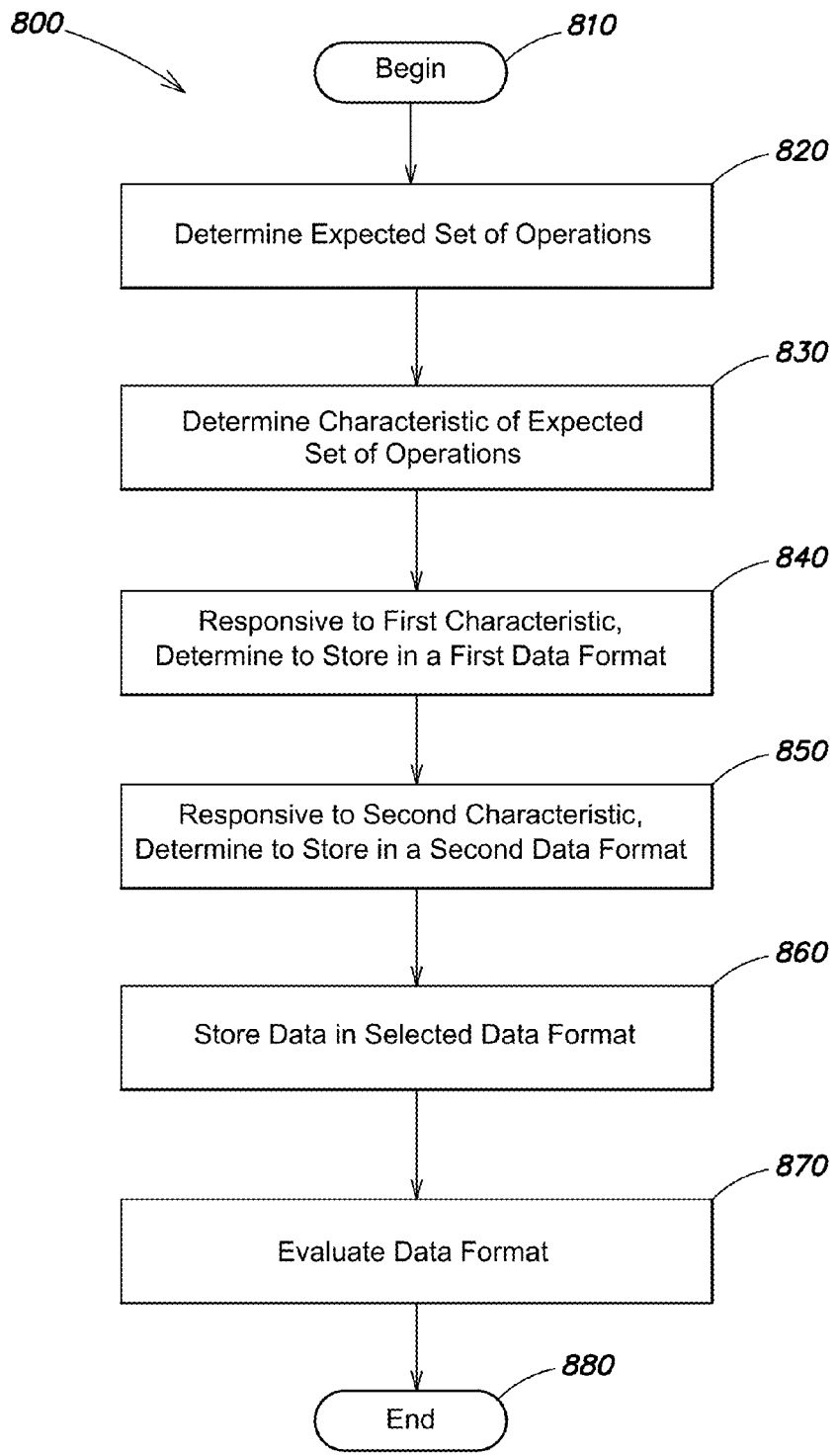
FIG. 8 illustrates an example process flow for selecting a data format for a portion of the database, according to one embodiment.

FIG. 8 is an example process 800 for operating a storage API on a database server (e.g., the shard server 600 depicted in FIG. 6). Process 800 can be used in conjunction with process 700 or may call process 700, for example, once index data has been retrieved by a storage engine. At step 810, process 800 begins. At step 820, an expected set of operations to be performed on a portion of a database is determined. In one embodiment, the portion of the database stores one type of information, such as primary data, index data, or an oplog, for that database. In some embodiments, the portion of the database may not represent the entirety of that type of data. For example, where the portion of the database is some subset of the primary data, other portions of the database may also store primary data. Furthermore, the portion of the database may represent a single document, a collection of documents, or the entire database.

In some embodiments, the expected set of operations is determined based on the type of data stored in the portion of the database. Different data types often have different characteristics that may help in identifying or predicting an expected set of operations. For example, a portion of the database storing an oplog may be expected to undergo more write operations than read operations, since each operation performed on the primary data of the database will be written to the oplog, but the oplog will only be read relatively occasionally (e.g., in the event of a database failure or data inconsistency). By contrast, primary data in the database may be more likely to have a higher number of read operations, since database queries often represent a significant portion of the operations performed on the database.

In some embodiments, the amortized cost of a typical operation may be considered. For example, primary data is considered to have a relatively high locality of reference, meaning that, when performing an operation on a piece of stored data, the data in nearby memory locations is more likely to be relevant/required in related operations than a randomly selected memory location. When a document is stored in row-store format, for example, the data is stored contiguously; reading multiple blocks of data in one read operation is likely to yield several useful pieces of data in responding to a query. Thus, the cost (in time) of that read operation may be amortized over the number of relevant pieces of data read during that operation. For example, if a read operation takes x amount of time, but is able to read in 10 pieces of information needed in responding to the current query, then the amortized cost of that read operation may be considered x/10. In some embodiments, this amortized cost may be used in determining the expected set of operations.

Relatedly, in some embodiments, the expected set of operations is determined based on the nature of the data stored in the portion of the database. As discussed above, primary data may be expected to have a relatively higher proportion of read operations than oplog data. It will also be appreciated that the nature of some types of primary data, for example, may be used in identifying or predicting an expected set of operations. For example, a portion of a database that stores product information for an ecommerce store that rarely changes its product offerings may be expected to have a relatively high number of read operations as opposed to write operations, since the product information may often be accessed (i.e., read) by visitors to the website but may rarely be updated (i.e., written) by the store administrator. On the other hand, a portion of a database that stores inventory information for a high-volume ecommerce store may be expected to have a relatively high number of both read and write operations, as visitor purchases necessitate verifying (i.e., reading) and updating (i.e., writing) the inventory information to the database.

In some embodiments, the expected set of operations is determined based on a historical analysis of the portion of the database and the other data (and metadata) available for that portion of the database. For example, the oplog may be consulted to determine how many read operations are performed on a portion of the database storing primary data. In some embodiments, a tally may be kept of the number and type of operations performed on the portion of the database during a particular time period. These operation tallies may be used to determine, for a particular time period, the relative proportions of read and write operations performed on the portion of the database. Those relative proportions may then be considered in identifying or predicting an expected set of operations to be performed on the portion of the database. For example, where a database index has historically undergone many more read operations than write operations, it may be concluded that the expected set of operations for that portion of the database storing the database index will continue to have a proportionally higher number of read operations. In some embodiments, more recent historical data is weighted more heavily than older data, so that a recent change in the way the portion of the database is being used (e.g., the primary data has started to undergo a higher proportion of reads than writes) will be appropriately taken into account in identifying an expected set of operations in the future.

In some embodiments, an analogous historical period is identified, and analytics from that period referred to, in determining the expected set of operations. In some embodiments, the time of day, day of week, day of month, or dates of the year are taken into account in identifying an expected set of operations. In one example, it may be determined that the beginning of the month is a busy time for website-based enrollments in a program, and therefore a large number of write operations may be expected. Similarly, in another example, it may be determined that a database supporting an e-commerce store performs an extraordinary number of read operations in the days following the U.S. Thanksgiving holiday, as shoppers browse for holiday purchases. These insights into past time periods may be used to predict an expected set of operations in a current corresponding time period.

In some embodiments, the expected set of operations to be determined may include more than the read and write operations. For example, it may be determined, based on a user profile, historic practice, or configuration parameters that data will be written and read in a compressed format in order to save storage space. In such embodiments, considerations relating to those operations may also be considered.

The factors considered in making the determinations above may be considered in conjunction with one another. In one embodiment, the layout of the portion of the database, such as a collection of documents, may be considered along with the historical ways in which the data in the collection is accessed. For example, the documents in a collection may have a large number of fields, only some of which are populated or accessed. (This situation may be considered analogous to a "wide" table having many columns, only few of which are populated.) In this example, where only a relative few fields are being accessed, a determination may be made that it should be expected that reading a small number of fields from many documents is more likely to occur than reading entire documents.

At step 830, a characteristic is determined of the expected set of operations to be performed on the portion of the database. The characteristic may be a count, threshold, minimum or maximum amount, ratio, percentage, or other measurement based on, derived from, or calculated from the expected set of operations. In some embodiments, the characteristic is the relative number of expected read operations as compared to write operations, which may be expressed as a read/write ratio. In some embodiments, this read/write ratio may be weighted according to the predicted speed of performing various operations on the portion of the database, given the arrangement of the database. For example, read operations on a relatively small collection, most or all of which can be stored in memory, may be performed relatively quickly. Operations performed on a larger collection may likely require more reads from disk, which are typically quite a bit slower than memory reads. The relatively "expensive" read operations in the latter case may be a characteristic considered in determining what data format should be used. For example, "expensive" read operations may be assigned a weighted value of greater than 1.0 read operations, whereas more "inexpensive" read operations (such as those from memory) may be assigned a weighted value of 1.0 read operations.

At step 840, responsive to the expected set of operations having a first characteristic, a determination is made to store the portion of the database in a first data format, and at step 850, responsive to the expected set of operations having a second characteristic, a determination is made to store the portion of the database in a second data format. Thus, depending on the characteristics of the set of operations expected for the portion of the database, the portion of the database may be configured to store the data in a selected one of a number of formats.

In one embodiment, the determination to store data in a given format is made with respect to the weighted or unweighted read/write ratio discussed above. For example, where the read/write ratio is relatively high (i.e., a proportionally higher number of read operations may be expected for the portion of the database), a data format most suited for a high volume of read operations is identified. In this example, a row-store format or column-store format may be selected. In some embodiments, the selection is made with respect to other characteristics of the data, as discussed above. For example, where multiple fields within a document are likely to be read (e.g., retrieving employee profiles from a database storing individual employee information in a document), a row-store format may be suitable, since in a row-store format the document fields are stored in contiguous memory locations. Where a single field is likely to be read from multiple documents (e.g., reading salary information for an entire company), a column-store format may be suitable, since in a column-store format all values for a particular field are stored in contiguous memory locations. As another example, where the read/write ratio is relatively low (i.e., a proportionally higher number of write operations may be expected for the portion of the database), a data format most suited for a high volume of write operations is selected. In this example, a LSM-tree format is selected.

In some embodiments, the determination to store data in a given format may be made with reference to other expected operations beyond read and write operations. For example, if it was determined in step 820 that the portion of the database is likely to be compressed in order to save storage space, the determination may be made to store the data in a format conducive to compression. For example, it is known that a collection of like types of data may be more efficiently compressed than a collection of disparate types of data, given the techniques that can be applied to homogeneous data. In such a situation, it may therefore be suitable to store the data in a column-store format, keeping like values (i.e., fields) contiguous and enjoying the benefits of compression of homogeneous data.

In optional step 860, the portion of the database is stored in the selected data format. In some embodiments, the entire portion of the database is stored in the selected data format as soon as practicable. In other words, the entire portion of the database may be stored in the selected data format at the next available opportunity. In other embodiments, the portion of the database is stored in the selected data format as write operations occur. In such embodiments, the migration to the selected format occurs gradually.

In optional step 870, at some point in time after the portion of the database is stored in the selected data format, the benefit or effect of the selection of the data format is assessed by comparing the performance of the system both before and after the selection according to various metrics. For example, the average time to perform a write operation and/or a read operation may be compared from before and after the format was selected and put into use. If the average time has gotten smaller (i.e., the database is more quickly performing operations), then the selected format may be considered an improvement over the previous format. On the other hand, if performance has not improved or has degraded, the system may determine whether the previous format should be reverted to. In some embodiments, the administrators or users of the system may be alerted to the possibility that the selected format is not an improvement, and options may be provided to select the previous format, continue to use the current format, or perform additional analysis.

Process 800 ends at step 880.

It will be appreciated that process 800 may be performed with respect to individual nodes within a replica set, selecting a suitable data format for each portion of the database stored on each node. Thus, with reference to FIG. 5, a portion of the database stored on primary node 520 may be stored in a different selected format than the corresponding portion of the database stored on secondary node 430. For example, the primary data 522 may be stored in primary node 520 in an LSM-tree format, since as discussed above, in some embodiments the primary node 520 may be responsible for handling the write operations directed to the replica set. On the other hand, the corresponding primary data 532 in secondary node 530 may be stored in a row-store format, since in such embodiments the secondary nodes 530, 540 may be responsible for handling read operations directed to the replica set. The system may be configured to migrate data from the primary node 520 to the secondary node 530, 540, handling such migration according to the selected data format for that portion of the database on each node In some embodiments, regardless of the storage format, a translation component can translate the storage format into a byte stream, for example, to facilitate comparison operations between the translated data and other data requests.

Figure 9:
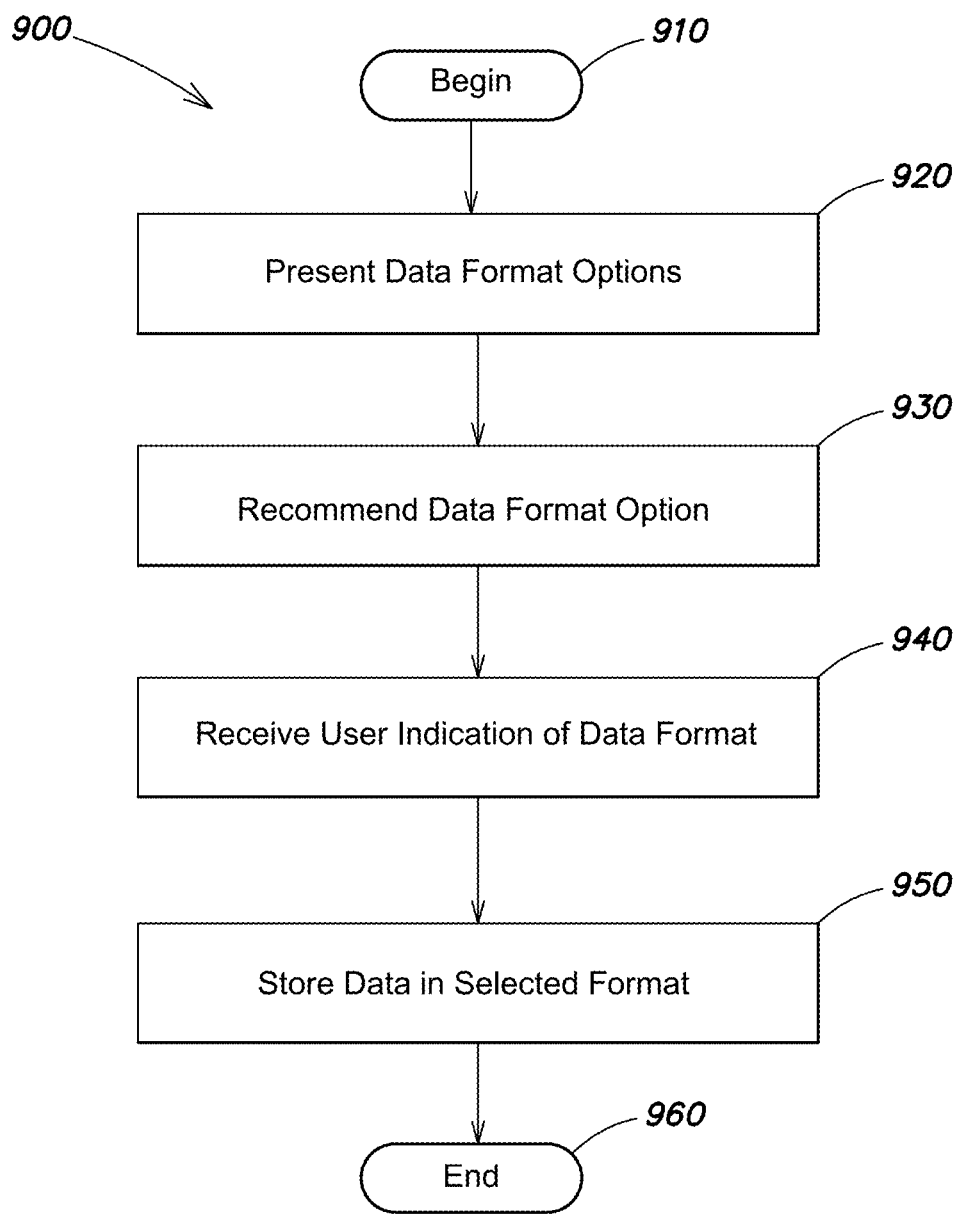
FIG. 9 illustrates another example process flow for selecting a data format for a portion of the database, according to one embodiment.

FIG. 9 is an example process 900 for operating a database server (e.g., the shard server 600 depicted in FIG. 6), wherein a user of the system is provided an option to select a storage format. At step 910, process 900 begins. At step 920, one or more data format selection options for a portion of a database may be presented to a user. The user may be an administrator of the database system, or may be any user with credentials that allow for selection of a data format for the portion of the database. In a preferred embodiment, the user interacts with the system via a user interface allowing for the selection of data formats to be used in storing a portion of the database. A screen may be displayed to the user providing the option to identify a portion of the database and choose a desired data format in which to store that portion of the database. In some embodiments, a storage engine selector may assist with the decision by providing analytics and recommendations enabling an informed decision regarding the storage format. For example, the user may be presented with an interface showing the historical read/write operation ratio for particular period of time, which may be configurable. Other analytics and metadata about the database (or the portion of the database to be stored) may also be presented, including the size and layout of the data.

At optional step 930, one or more recommendations may be presented to the user regarding data format options for the portion of the database. The recommendation may be formed based on the considerations discussed above with respect to steps 930 and 940 of process 900. For example, the type of data, amortized cost of a typical operation, the nature of the data, a historical analysis of the portion of the database and the other data (and metadata) available for that portion of the database, compression, and other considerations may be taken into account. In some embodiments, a plurality of recommendations are provided in a prioritized order determined by the system.

In some embodiments, before or concurrent with the user being provided with one or more recommendations, the user may be presented with the option to identify priorities for the database. For example, the user may be asked to place a relative importance on the speed of read operations, the speed of write operations, and the like. In some embodiments, configuration decisions made by the user may also affect the recommendations. For example, the user may be queried whether compression will be used on the portion of the database. If so, a data format suitable for compression may be recommended. For example, it is known that a collection of like types of data may be more efficiently compressed than a collection of disparate types of data, given the techniques that can be applied to homogeneous data. In such a situation, it may therefore be suitable to store the data in a column-store format, keeping like values (i.e., fields) contiguous and enjoying the benefits of compression of homogeneous data.

In some embodiments, the user may be provided with the option to identify multiple data formats, from which one is selected based on thresholds that the user also provides. For example, the user may be prompted to enter a threshold read/write ratio (e.g., 80%) at which a portion of the database that meets that threshold at a given time will be stored in a chosen format (e.g., row-store format). The user may be provided the option to be prompted to switch to such a data format when the threshold is reached, or to have the switch be made automatically. In some embodiments, the threshold must be met or exceeded for a certain amount of time before the switch is enacted, to avoid too-frequent format changes in the event of temporary activity.

In step 940, the user's selection of one or more data formats is received through a user interface. In step 950, the portion of the database is stored in the selected data format. In some embodiments, the entire portion of the database is stored in the selected data format as soon as practicable. In other words, the entire portion of the database may be stored in the selected data format at the next available opportunity.

In other embodiments, the portion of the database may be stored in the selected data format at a time selected by the user. For example, when selecting the data format (or the threshold for switching to the data format), the user may be prompted whether the change should go into place right away, or should be deferred for some amount of time or until some event occurs. The user may be given the option to defer the change for a certain number of minutes or hours, or may be given the option to have the change applied at a time of low database activity (for example, during the middle of the night).

In still other embodiments, the portion of the database is stored in the selected data format as write operations occur. In such embodiments, the migration to the selected format occurs gradually. Process 900 ends at step 960.

Example Hybrid Encoding

According to one embodiment, the translation subsystem (e.g., 100) comprises a translation matrix (e.g., 112) that includes encoding for a hybrid binary/decimal where the most significant part of the encoding is binary but with a decimal continuation for decimal numbers that cannot be exactly represented in binary. For example, use of a 2-bit decimal continuation indicator enabled the value to be encoded while omitting the decimal continuation for binary numbers, for decimal numbers with at most 15 significant digits, while preserving correct interleaving with more precise values.

Figure 13:
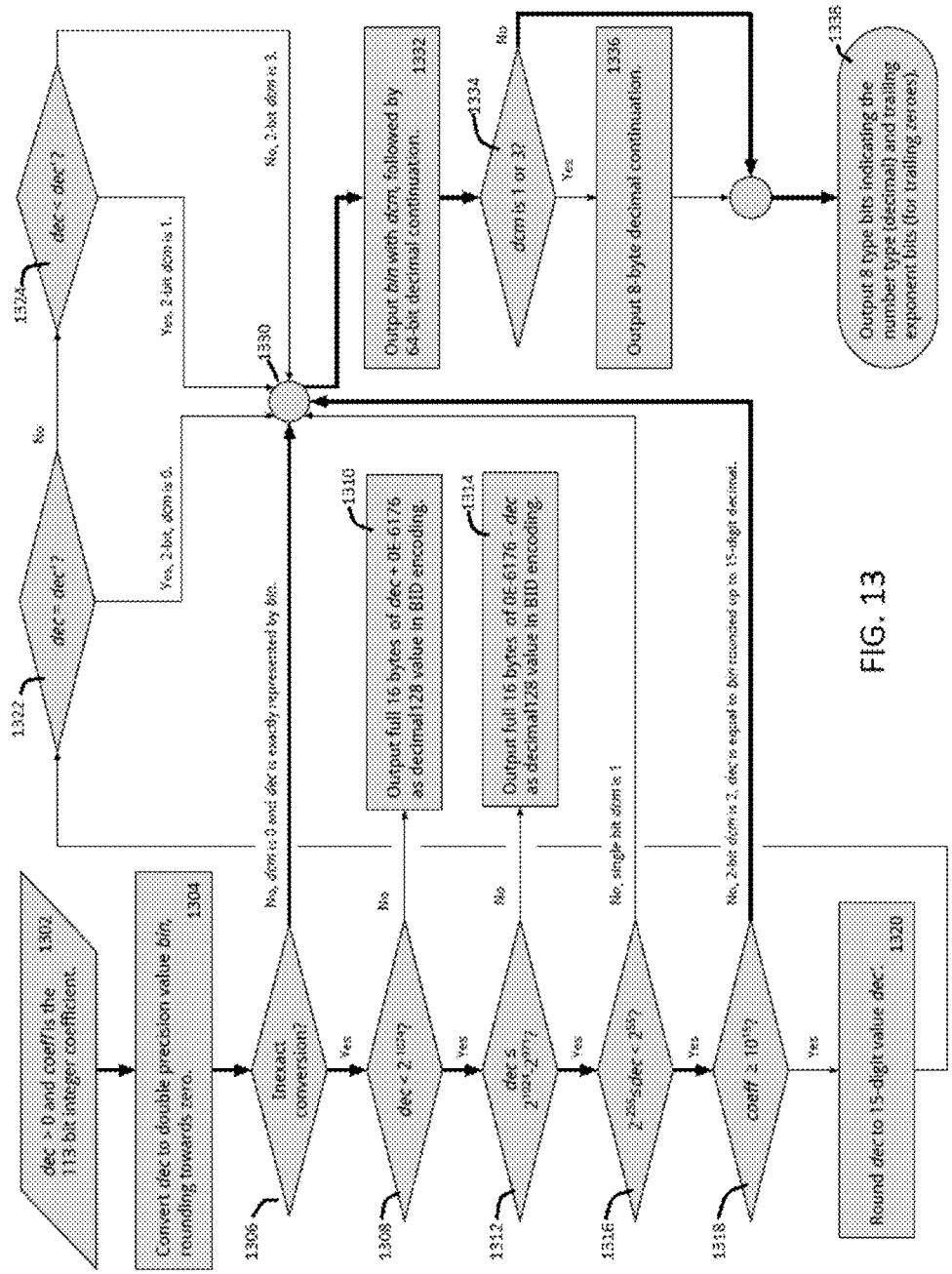
FIG. 13 is an example process flow for encoding hybrid decimal/binary values, according to one embodiment.

Various implementations of the translation matrix include optimized encoding for common decimal numbers (e.g., with at most 15 decimal digits) avoiding overhead in the value encoding compared to binary numbers. Example process flow 1300 shown in FIG. 13, provides example logic for value encoding, according to various embodiments.

One of the properties of the translated or KeyString encoding is that there is only a single encoding for a given mathematical number: only the type bits are used for determining the type (e.g., 32-bit integer, 64-bit integer, 64-bit double precision binary floating point or 128-bit decimal).

The encoding for integers does not materially change across various embodiments (e.g., hybrid translation enabled or not enabled) and the encoding for double precision numbers enables room in the decimal continuation marker ("DCM"). According to one embodiment, decimal values that are in fact integers, or mathematically equal to binary floating point numbers (0, 1.00, 1234.25, 0.125, 12345678901234.5), are encoded the same way as integers, or binary floating point numbers respectively, except that they have 8 type bits. All other decimal numbers in the range $2^-255 \leq x \leq 2^55$, or about $1.7*10^-77$ to $3.6*10^16$, that have at most 15 decimal digits excluding leading and trailing zeros, will be encoded as a double precision number with the decimal continuation marker set to 2.

Thus, the decimal 42.00 is encoded as 2B54 with type bits 07. So, if the BSON index key is {"": NumberDecimal ("42.00")}, the final encoding including terminator byte 04 is 2B540407. Shown in FIG. 14 is a table with example numbers and encodings including the encoding of decimal128 number "42.00" (1402) and encoded value (1404). The Bytes/Key column (1406) indicates the usage in bytes per key: which reflects the actual required space per key, if the index entry has more than a single key (compound key). The Total Bytes column (1408) is the total size of the index entry if the given value appears on its own, and includes any required terminator/length bytes. A single space (" ") (shown in values of column 1410) indicates the separation between the key part that is significant for comparisons, and the type bits that are required for reconstructing the exact type (e.g., int/binary float/decimal) and preferred exponent (trailing zeros). The type bits column reflects the number of bits used to encode the data type. According to various embodiments, typeBits (1412) encoding includes options for preserving trailing zeros (example of the encoding—if available). As a result, in MongoDB, all numeric types, including decimal128, can be mixed in the same index while providing ordering by true numeric value. In addition, typical size and speed overhead for indexing and querying Decimal128 values is comparable to that for other numeric types.

Returning to FIG. 13, process 1300 begins with a value type of decimal128—a decimal floating-point computer numbering format that occupies 16 bytes (128 bits) in computer memory. Decimal128 supports 34 decimal digits of significand and an exponent range of $-6143$ to $+6144$, i.e. $\pm 0.000000000000000000000000000000000 \times 10^{-6143}$ to $\pm 9.999999999999999999999999999999999 \times 10^{6144}$. (Equivalently, $\pm 0000000000000000000000000000000000 \times 10^{-6176}$ to $\pm 9999999999999999999999999999999999 \times 10^{6111}$.)

Therefore, decimal128 has the greatest range of values compared with other IEEE basic floating point formats. As the significand is not normalized, most values with less than 34 significant digits have multiple possible representations; $1 \times 10^2 = 0.1 \times 10^3 = 0.01 \times 10^4$, etc. Zero has 12288 possible representations (24576 if you include both signed zeros).

At 1302 the decimal value ("dec") is determined to be >0 and the coefficient encoded in the representation is identified as the 113-bit integer coefficient. AT 1304, the decimal is converted to a double precision value binary, rounding toward zero. At 1306, the result is tested to determine if the output is an inexact version (1306 YES). If inexact, the output is classified according to the value of the decimal: determine if decimal $<2^{-1074}$ at 1308. If not, 1308 NO, then output full 16 bytes of decimal +0E-6176 as decimal128 value in BID encoding (Binary Integer Decimal encoding) at 1310. If 1308 YES ($<2^{1074}$) classification includes determining at 1312 if dec is less than or equal to $2^{1024}-2^{971}$. If not 1312 NO, then output full 16 bytes of 0E-6176—dec as decimal128 value in BID encoding at 1314. IF 1312 YES, then determine if dec is greater than or equal to $2^{-255}$ and less than $2^{55}$ at 1316. If 1316 YES, then determine if coefficient (i.e., the 113-bit integer coefficient) is less than or equal to $10^{15}$ at 1318. If 1318 YES, dec is rounded to a 15-digit value dec' at 1320, which is tested for equality at 1322 against dec. If equal 1332 YES, assign a two bit DCM set to zero. If not equal 1322 NO, evaluate dec as less than dec' at 1324. If less than dec' 1324 YES, the two bit DCM is 1. If not less than 1324 NO, the two bit DCM is 3. Each of 1306 NO, 1316 NO (single bit DCM), 1318 NO (2-bit DCM is 2, dec is equal to bin rounded up to 15-digit decimal), 1322 YES, 1324 YES, and 1324 NO, proceeds through 1330 (illustrated for clarity). At 1332, process 1300 continues with output of bin encoding with DCM, followed by 64-bit decimal continuation. At 1334, the DCM is evaluated. If the DCM is 1 or 3 1334 YES, then output an 8-byte decimal continuation 1336. If not, 1334 NO, then output Stype bites indicating the number type (decimal) and trailing exponent bite (encoded for trailing zeroes) at 1334. At The various processes described herein can be configured to be executed on the systems shown by way of example in FIGS. 1-6. The systems and/or system components shown can be programmed to execute the processes and/or functions described. Additionally process 900 can be used in conjunction with process 700, or may call process 700 responsive to retrieving data for translation. In some embodiments, any database analytic information, for example, identified during execution of process 800 and 900 can be retained and used by the system to make determinations on whether efficiency can be improved responsive to translating a first data format into a canonical byte stream format.

In various embodiments, other computer systems can be configured to perform the operations and/or functions described herein. For example, various embodiments according to the present invention may be implemented on one or more computer systems. These computer systems may be, specially configured computers, such as those based on Intel Atom, Core, or PENTIUM-type processor, IBM PowerPC, AMD Athlon or Opteron, Sun UltraSPARC, or any other type of processor. Additionally, any system may be located on a single special purpose computer or may be distributed among a plurality of computers attached by a communications network.

A computer system can be specially configured as disclosed herein. According to one embodiment of the invention the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers.

Figure 10:
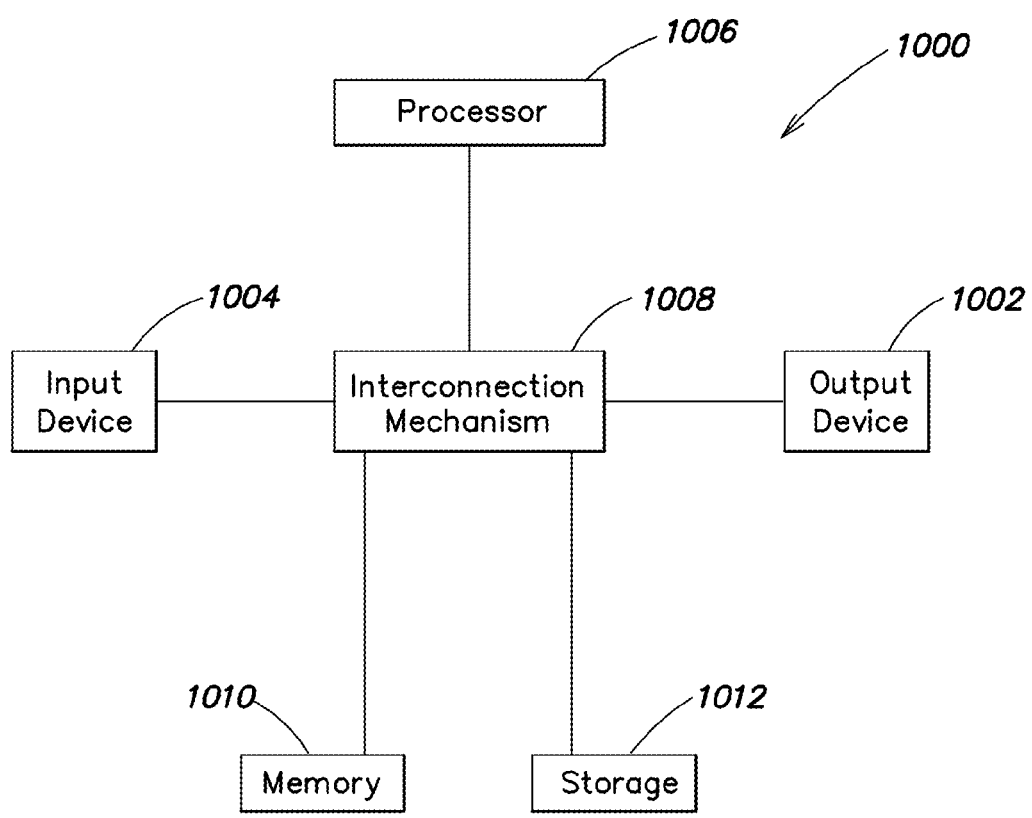
FIG. 10 is a block diagram of an example distributed database system, according to one embodiment.

FIG. 10 shows a block diagram of an example special-purpose computer system 1000 on which various aspects of the present invention can be practiced. For example, computer system 1000 may include a processor 1006 connected to one or more memory devices 1010, such as a disk drive, memory, or other device for storing data. Memory 1010 is typically used for storing programs and data during operation of the computer system 1000. Components of computer system 1000 can be coupled by an interconnection mechanism 1008, which may include one or more busses (e.g., between components that are integrated within a same machine) and/or a network (e.g., between components that reside on separate discrete machines). The interconnection mechanism enables communications (e.g., data, instructions) to be exchanged between system components of system 1000.

Computer system 1000 may also include one or more input/output (I/O) devices 1002-1004, for example, a keyboard, mouse, trackball, microphone, touch screen, a printing device, display screen, speaker, etc. Storage 1012, typically includes a computer readable and writeable nonvolatile recording medium in which computer executable instructions are stored that define a program to be executed by the processor or information stored on or in the medium to be processed by the program.

Figure 11:
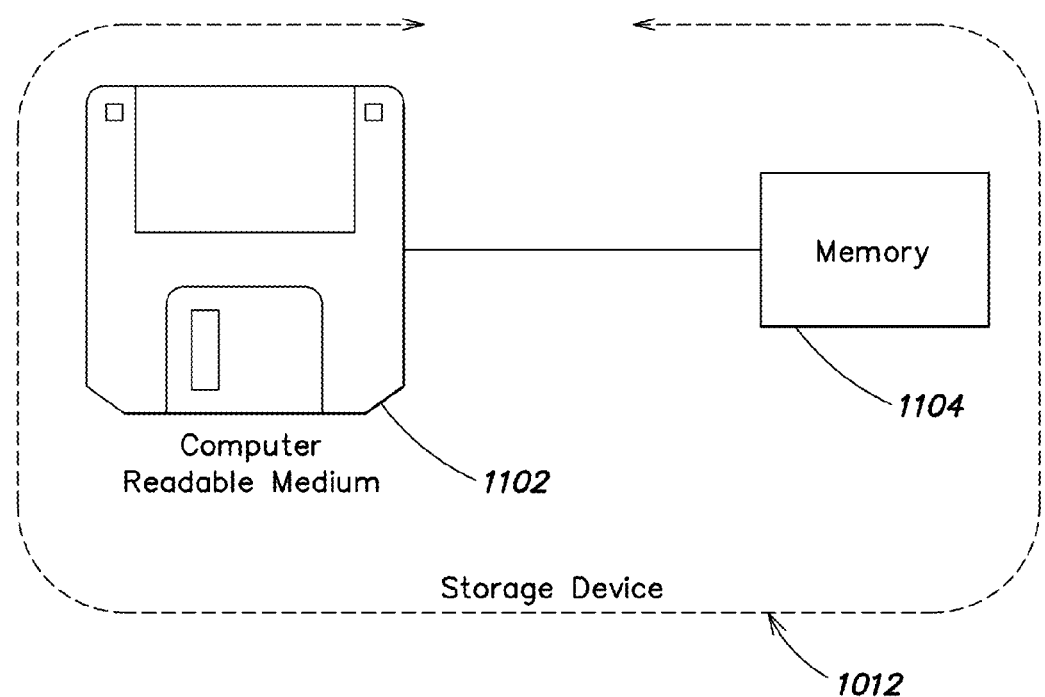
FIG. 11 is a block diagram of an example distributed database system, according to one embodiment.

The medium can, for example, be a disk 1102 or flash memory as shown in FIG. 11. Typically, in operation, the processor causes data to be read from the nonvolatile recording medium into another memory 1104 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 10, the memory can be located in storage 1012 as shown, or in memory system 1010. The processor 1006 generally manipulates the data within the memory 1010, and then copies the data to the medium associated with storage 1012 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 1000 is shown by way of example, as one type of computer system upon which various aspects of the invention can be practiced, it should be appreciated that aspects of the invention are not limited to being implemented on the computer system as shown in FIG. 10. Various aspects of the invention can be practiced on one or more computers having a different architectures or components than that shown in FIG. 10.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other object-oriented programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Figure 12:
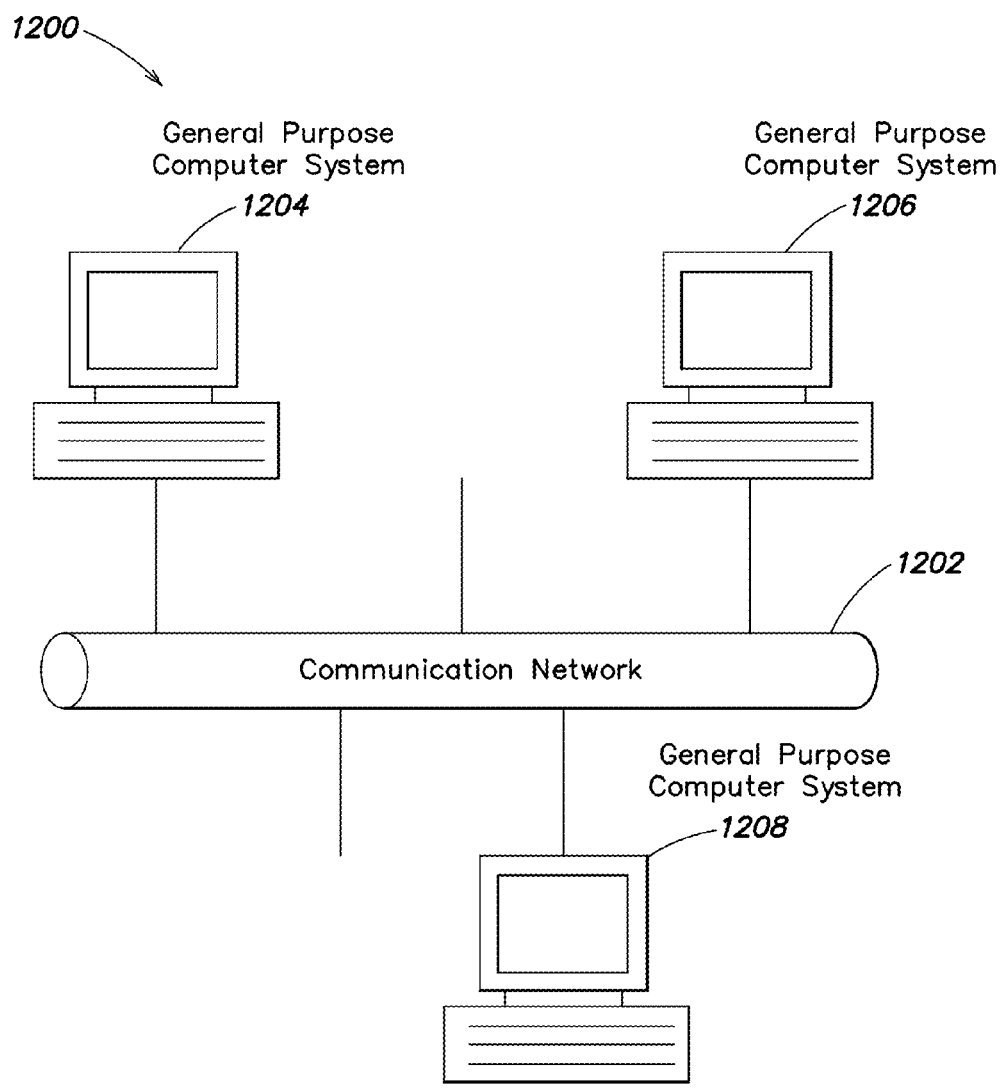
FIG. 12 is a block diagram of an example distributed database system, according to one embodiment.

Various aspects of this invention can be implemented by one or more systems similar to system 1200 shown in FIG. 12. For instance, the system can be a distributed system (e.g., client server, multi-tier system) comprising multiple special-purpose computer systems. In one example, the system includes software processes executing on a system associated with hosting database services, processing operations received from client computer systems, interfacing with APIs, receiving and processing client database requests, routing database requests, routing targeted database request, routing global database requests, determining global a request is necessary, determining a targeted request is possible, verifying database operations, managing data distribution, replicating database data, migrating database data, identifying index data, translating index data, referencing a translation matrix, encoding data according to canonical types and values, etc. These systems can also permit client systems to request database operations transparently, with various routing processes handling and processing requests for data as a single interface, the routing processes can manage data retrieval from database partitions, compare data requests to index byte streams, merge responses, and return results as appropriate to the client, among other operations.

There can be other computer systems that perform functions such as hosting replicas of database data, each server hosting database partitions can be implemented as a replica set, among other functions. These systems can be distributed among a communication system such as the Internet. One such distributed network, as discussed below with respect to FIG. 12, can be used to implement various aspects of the invention. Various replication protocols can be implemented, and in some embodiments, different replication protocols can be implemented, with the data stored in the database replication under one model, e.g., asynchronous replication of a replica set, with metadata servers controlling updating and replication of database metadata under a stricter consistency model, e.g., requiring dual phase commit operations for updates.

FIG. 12 shows an architecture diagram of an example distributed system 1200 suitable for implementing various aspects of the invention. It should be appreciated that FIG. 12 is used for illustration purposes only, and that other architectures can be used to facilitate one or more aspects of the invention.

System 1200 may include one or more specially configured special-purpose computer systems 1204, 1206, and 1208 distributed among a network 1202 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, analyzing database operations, identifying index data, translating data formats, and rebalancing for collections with sequential keying architectures.

In some embodiments, a system and method is provided for a database storage API capable of selectively mapping to different pluggable storage engines and storage formats, that can include or invoke translation engines or alternatively accessed translated copies of data. In one embodiment, the database storage API is employed in a non-relational database system, in which documents or other structures not limited by a schema are stored. In one example, the selection of a particular storage engine and/or data format may be made by a user via a user interface. The user may be presented with one or more recommendations of optimal storage engines for a particular data structure, collection, or database according to one or more factors. In another example, the database engine may select a particular storage engine and/or data format, translation or no translation, or the storage engine itself or other system components may select a particular data format based on one or more factors. For example, a storage engine and/or data format may be selected for its expected optimal performance as compared to other storage engine options.

The factors used to recommend or select an optimal storage engine or data format may relate to the type and breakdown of historical operations performed on the database (e.g., volume of write requests, volume or read requests, timing of writes and/or read, sparsity of data, index references, etc.), and/or the characteristics of a set of operations predicted to be performed on the database. Such predictions can be made based on the layout of the data, the nature of the data, the data type (e.g., primary database data or database index data), historical operations for a given time period, database compression characteristics, or other aspects of the data and the operations to be performed on it. In some embodiments, a change in storage engines for a portion of the database is assessed to determine if the database performance with respect to that portion is more optimal before or after the change, so that appropriate measures may be recommended or taken.

In some embodiments, the storage API uses the tracked data (e.g., analytics data) collected by a database monitor and/or analytics data to select an optimal storage engine and/or data format for a database, a collection, or a document having the observed read/write ratio. In one example, the storage API is mapped to the selected storage engine based on the tracked data. The first storage engine and the second storage engine are executable software modules configured to store database data in the data node 110 in one or more data format. For example, the first storage engine may be configured to store data in a row-store format, and the second storage engine may be configured to store data in a LSM-tree format. In one example, the first storage engine and/or the second storage engine are configured store primary database data (i.e., the data being stored and queried) in a particular data format in the primary data storage, and may store database index data in a particular data format in index data storage. In one embodiment, the first storage engine and/or the second storage engine are configured store an oplog in a particular data format.

In some embodiments, analytics data about the performance of the storage engines may be stored by the first storage engine and/or the second storage engine, and may not be stored separately as analytics data. For example, the database API may pass a "write" function call to the storage API instructing the storage API to write a particular set of data to stable storage. The storage API then determines, according to its own analysis and/or user input, which storage engine should perform the write operation in which data format. Different storage engines may be appropriate for different types of data stored in different collections that may undergo a variety of different operations.

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," " third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A database system comprising:
at least one processor configured to execute a plurality of system components, wherein the system components comprise:
a translation component configured to:
translate input data in a first format into a canonical format;
analyze original data elements in the first format to determine a data type associated with respective data elements;
map each individual data element of the input data to a canonical data type associated with the determined data type;
encode each individual data element into a byte stream comprising at least:
a canonical type byte based on the mapping; and
at least one data value for data of the data element where present; and
a database manager configured to:
receive requests for database operations from client systems and respond to the requests; and
execute data comparison operations against the canonical format byte stream to respond to at least some of the requests for database operations.

2. The system of claim 1, wherein the translation component is further configured to identify index data within the database, and select the index data for translation.

3. The system of claim 2, wherein the translation component is configured to store the canonical byte format byte stream in a segregated memory space.

4. The system of claim 1, wherein the database system further comprises a memory for segregating index data, and the database manager is configured to access the canonical format byte stream from the memory.

5. The system of claim 1, further comprising a translation matrix defining a mapping between a data type in a first format and an encoding of any data values associated with the data type in the first format, wherein the translation component is further configured to access the translation matrix to generate the canonical format byte stream from the input data.

6. The system of claim 5, wherein the translation matrix defines a mapping for each of the data types having the first format to a respective canonical data type and associated type byte value.

7. The system of claim 6, wherein the translation matrix includes encoding mappings defining data element value encoding operations, such that, each data type and data value in the first data format is encoded as a canonical byte type value and at least one data byte value.

8. The system of claim 5, wherein the translation matrix includes encoding mappings for data elements having array data or having internal data elements.

9. The system of claim 8, wherein the encoding mappings define flags to encode in the byte stream for preserving ordering of array data and/or the internal data elements, when translated into the canonical byte stream.

10. A computer implemented method for managing a distributed database, the method comprising:
translating, by at least one processor input data in a first format into a canonical format;
analyzing, by the at least one processor, original data elements in the first format to determine a data type associated with respective data elements;
mapping, by the at least one processor, each individual data element of the input data to a canonical data type associated with the determined data type;
encoding, by the at least one processor, each individual data element into a byte stream comprising at least: a canonical type byte based on the mapping, and at least one data value for data of the data element where present; and
receiving, by the at least one processor, requests for database operations from client systems and responding to the requests; and
executing, by the at least one processor, data comparison operations against the canonical format byte stream to respond to at least some of the requests for database operations.

11. The method of claim 10, further comprising identifying, by the at least one processor, index data within the distributed database, and selecting, by the at least one processor, the index data for translation.

12. The method of claim 11, further comprising storing, by the at least one processor, the canonical byte format byte stream in a segregated memory space.

13. The method of claim 1, further comprising accessing, by the at least one processor, the canonical format byte stream from a segregated memory space.

14. The method of claim 1, further comprising mapping, by the at least one processor, between a data type in a first format and an encoding of any data values associated with the data type in the first format, wherein mapping includes accessing the translation matrix and generating the canonical format byte stream from the input data.

15. The method of claim 14, further comprising executing, by the at least one processor, a mapping defined in the translation matrix for each of the data types having the first format to a respective canonical data type and associated type byte value.

16. The method of claim 15, further comprising encoding, by the at least one processor, each data type and data value in the first data format into a canonical byte type value and at least one data byte value based on the translation matrix.

17. The method of claim 15, further comprising encoding, by the at least one processor, each data type and data value in the first data format into a canonical byte type value and at least one data byte value for data elements having array data or having internal data elements, recursively encoding array elements or internal data elements, and maintaining respective ordering.

18. The method of claim 17, further comprising encoding, by the at least one processor, translated data with flags in the byte stream that preserve ordering of array data and/or the internal data elements, when translated into the canonical byte stream.

19. A computer-readable medium having instructions thereon for causing a processor to execute the instructions, the instructions adapted to be executed to implement a method for managing a distributed database, the method comprising:
translating input data in a first format into a canonical format;
analyzing original data elements in the first format to determine a data type associated with respective data elements;
mapping each individual data element of the input data to a canonical data type associated with the determined data type;
encoding each individual data element into a byte stream comprising at least: a canonical type byte based on the mapping, and at least one data value for data of the data element where present; and
receiving requests for database operations from client systems and responding to the requests; and
executing data comparison operations against the canonical format byte stream to respond to at least some of the requests for database operations.

20. The medium of claim 19, wherein the method further comprising identifying, by the at least one processor, index data within the distributed database, and selecting, by the at least one processor, the index data for translation.

\* \* \* \* \*